(12) United States Patent
Sudo

(10) Patent No.: US 9,939,620 B2
(45) Date of Patent: Apr. 10, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Kenta Sudo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 15/252,921

(22) Filed: Aug. 31, 2016

(65) Prior Publication Data

US 2017/0090168 A1 Mar. 30, 2017

(30) Foreign Application Priority Data

Sep. 24, 2015 (JP) ................................. 2015-186576

(51) Int. Cl.
| | |
|---|---|
| *G02B 15/14* | (2006.01) |
| *G02B 15/173* | (2006.01) |
| *G02B 15/28* | (2006.01) |
| *G02B 5/00* | (2006.01) |

(52) U.S. Cl.
CPC ........... *G02B 15/173* (2013.01); *G02B 15/28* (2013.01); *G02B 5/005* (2013.01)

(58) Field of Classification Search
CPC .. G02B 13/0045; G02B 13/18; G02B 13/009; G02B 15/173; G02B 15/16; G02B 15/14; G02B 15/163; G02B 15/28; G02B 9/06; G02B 9/34

USPC ................ 359/687, 715, 758, 766, 774, 785
See application file for complete search history.

(56) References Cited

U.S. PATENT DOCUMENTS

| | | | |
|---|---|---|---|
| 7,385,766 B2 | 6/2008 | Ohtake | |
| 8,284,498 B2 | 10/2012 | Shinohara et al. | |
| 2012/0113527 A1* | 5/2012 | Horiuchi | ................ G02B 13/18 359/687 |

FOREIGN PATENT DOCUMENTS

| | | |
|---|---|---|
| JP | 2007212926 A | 8/2007 |
| JP | 2011145565 A | 7/2011 |
| JP | 2012088603 A | 5/2012 |

\* cited by examiner

*Primary Examiner* — Bumsuk Won
*Assistant Examiner* — Collin X Beatty
(74) *Attorney, Agent, or Firm* — Rossi, Kimms & McDowell LLP

(57) ABSTRACT

A zoom lens includes, in order from an object side to an image side, a first lens unit having a positive refractive power, a second lens unit having a negative refractive power, a third lens unit having a positive refractive power, a rear lens group including one or more lens units, and an aperture stop. During zooming, with the first lens unit not moving, the second lens unit and at least one of the lens units of the rear lens group move. In this zoom lens, the configuration of the third lens unit and the location of the aperture stop are appropriately set.

12 Claims, 14 Drawing Sheets

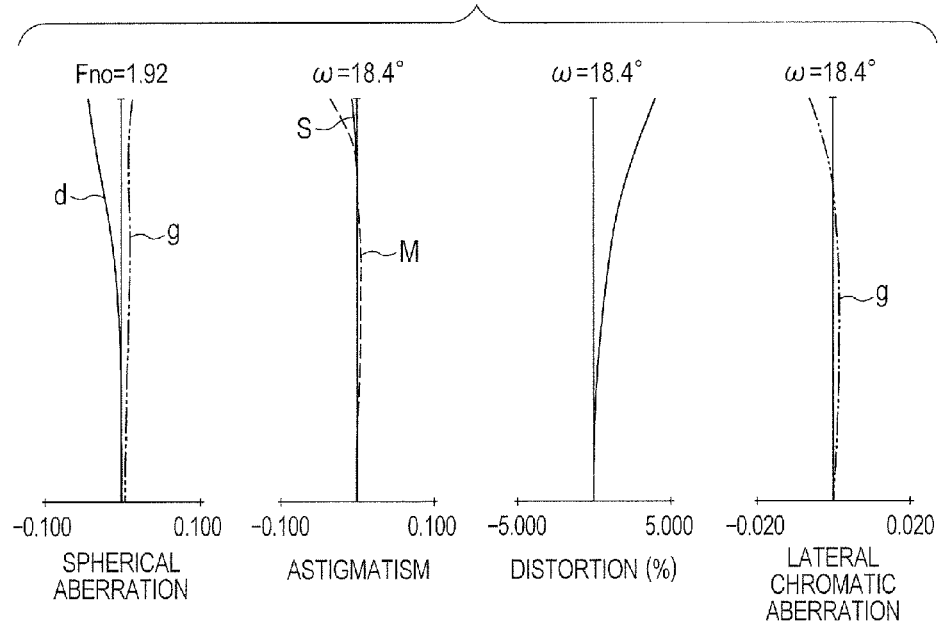
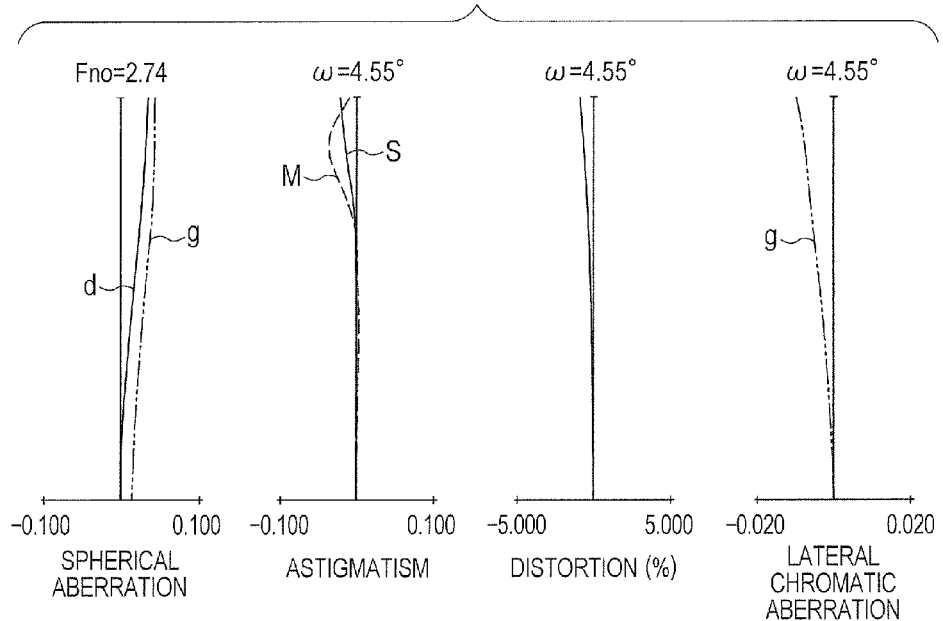

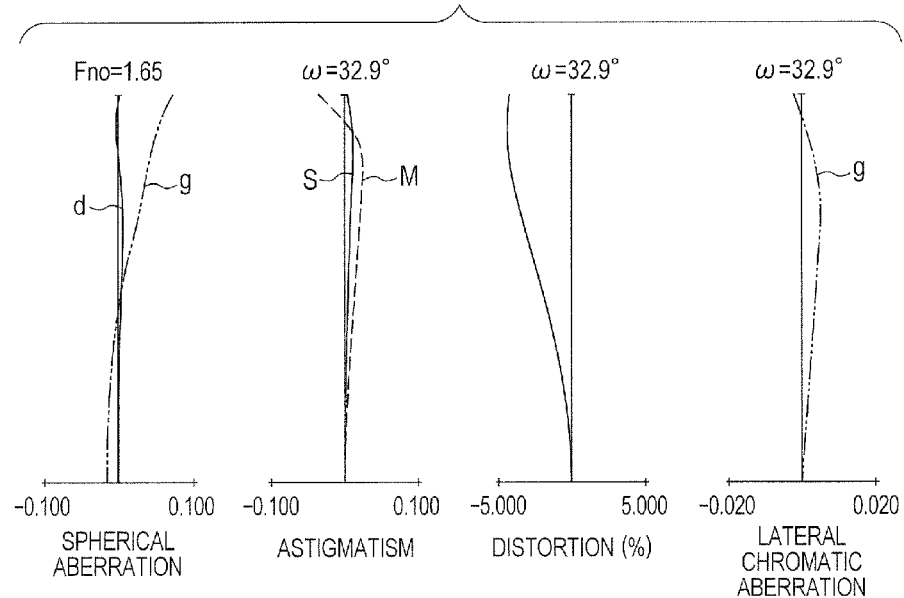
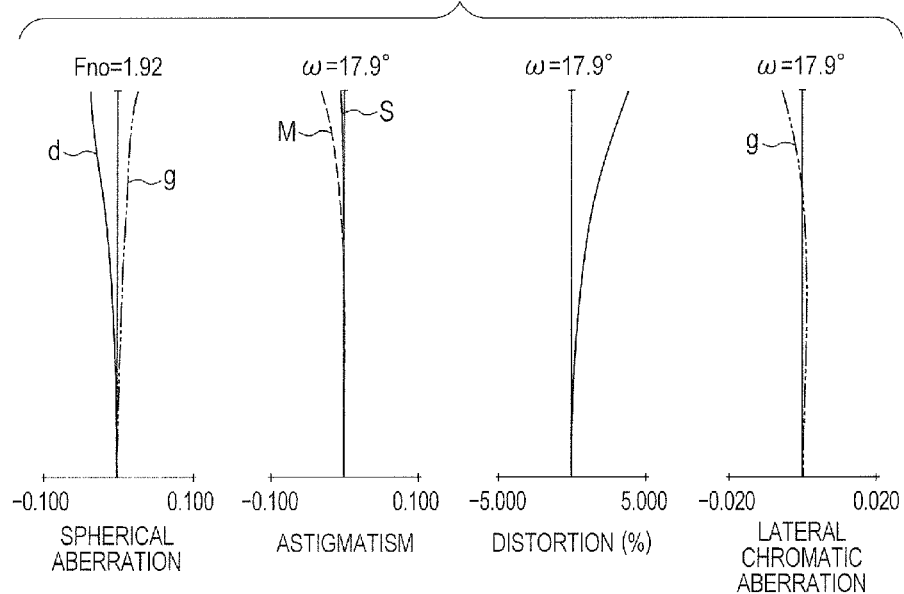

AXIAL-MARGINAL RAY ——
OFF-AXIAL PRINCIPAL RAY ----- it # ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, advantageously applicable to an image pickup apparatus that uses an image pickup element, such as a video camera, an electronic still camera, a broadcasting camera, or a monitoring camera, or to an image pickup apparatus that uses a silver-halide film.

Description of the Related Art

In recent years, a zoom lens for use as an image pickup optical system in an image pickup apparatus is desired to have a small overall lens length, a high zoom ratio, and a high resolving power. As a zoom lens meeting these demands, a positive lead type zoom lens is known, which has a lens unit having a positive refractive power at a position closest to an object side.

Japanese Patent Application Laid-Open No. 2011-145565 discloses a four-element zoom lens consisting of, in order from an object side to an image side, first to fourth lens units having positive, negative, positive, and positive refractive powers, respectively. For zooming, the second lens unit and the fourth lens unit move with the first lens unit not moving. For focusing, the fourth lens unit moves.

Japanese Patent Application Laid-Open No. 2012-88603 discloses a four-element zoom lens consisting of, in order from the object side to the image side, first to fourth lens units having positive, negative, positive, and positive refractive powers, respectively. For zooming, the second, third, and fourth lens units move. For focusing, the fourth lens unit moves. Japanese Patent Application Laid-Open No. 2007-212926 discloses a five-element zoom lens consisting of, in order from the object side to the image side, first to fifth lens units having positive, negative, positive, positive, and negative refractive powers, respectively. For zooming, the second and fourth lens units move with the first lens unit not moving. For focusing, the fourth lens unit moves.

It is typically easy to increase the zoom ratio of a positive lead type zoom lens. However, when the zoom ratio is increased, aberration variation increases in a range from a wide-angle end to a middle zoom position.

In order to obtain a zoom lens offering a high zoom ratio and high optical performance, it is important to appropriately determine the refractive power and configuration of each lens unit, or especially, the third lens unit.

SUMMARY OF THE INVENTION

A zoom lens of the present invention includes, in order from an object side to an image side, a first lens unit having a positive refractive power, a second lens unit having a negative refractive power, a third lens unit having a positive refractive power, and a rear lens group including one or more lens units. During zooming, the first lens unit does not move, the second lens unit and at least one of the lens units of the rear lens group move, and intervals between adjacent ones of the lens units change during the zooming. An aperture stop is arranged between the second lens unit and the third lens unit. The third lens unit consists of a first lens sub-unit having a positive refractive power and a second lens sub-unit having a negative refractive power being located on the image side of the first lens sub-unit with the largest air interval within the third lens unit. The second lens sub-unit consists of, in order from the object side to the image side, a negative lens G3$bn$ and a positive lens G3$bp$. The zoom lens satisfies the following conditions:

$$-2.0 < R3bn1/f3 < -0.1$$

$$0.15 < D3ab/Dsi < 0.30$$

where R3$bn$1 is a radius of curvature of an object-side surface of the negative lens G3$bn$, f3 is a focal length of the third lens unit, D3$ab$ is an air interval between the first lens sub-unit and the second lens sub-unit, and Dsi is a distance combining a back focus in air and a distance front the aperture stop to a lens surface closest to the image side at a wide angle end.

Further features of the present invention will become apparent from the following description of exemplary embodiments with reference to the attached drawings.

BRIEF DESCRIPTION OF THE DRAWINGS

FIG. 2B is a diagram showing longitudinal aberrations in the zoom lens of Embodiment 1 at a first middle focal length.

FIG. 2C is a diagram showing longitudinal aberrations in the zoom lens of Embodiment 1 at a second middle focal length.

FIG. 8A is a diagram showing longitudinal aberrations in the zoom lens of Embodiment 4 at the wide angle end.

FIG. 8B is a diagram showing longitudinal aberrations in the zoom lens of Embodiment 4 at the first middle focal length.

DESCRIPTION OF THE EMBODIMENTS

Preferred embodiment of the present invention will now be described in detail in accordance with the accompanying drawings.

Hereinbelow, descriptions are given of a zoom lens of the present invention and an image pickup apparatus including the same. The zoom lens of the present invention includes, in order from an object side to an image side, a first lens unit having a positive refractive power, a second lens unit having a negative refractive power, a third lens unit having a positive refractive power, and a rear lens group including one or more lens units.

For zooming, with the first lens unit not moving, the second lens unit and at least one of the lens units of the rear lens group move, thereby changing intervals between adjacent ones of the lens units change during the zooming. An aperture stop is arranged between the second lens unit and the third lens unit. The third lens unit consists of a first lens sub-unit having a positive refractive power and a second lens sub-unit having a negative refractive power and being located on the image side of the first lens sub-unit with the largest air interval within the third lens unit. The second lens sub-unit includes, in order from the object side to the image side, a negative lens G3bn and a positive lens G3bp.

Figure 1:
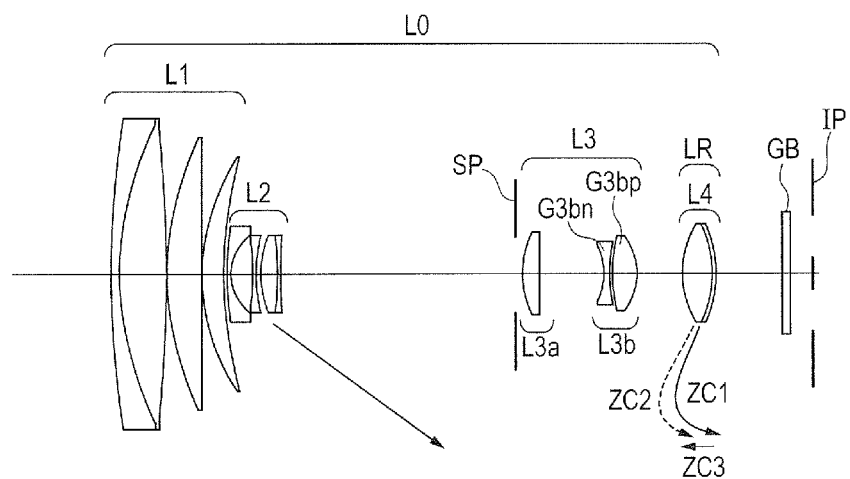
FIG. 1 is a sectional view of a zoom lens according to Embodiment 1 at a wide angle end, focusing at infinity.
Figure 2A:
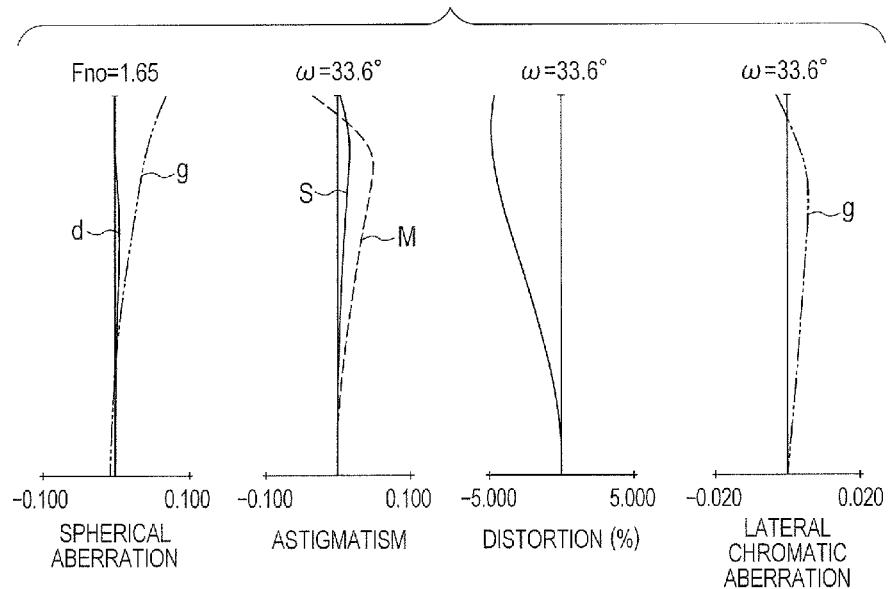
FIG. 2A is a diagram showing longitudinal aberrations in the zoom lens of Embodiment 1 at the wide angle end.
Figure 2D:
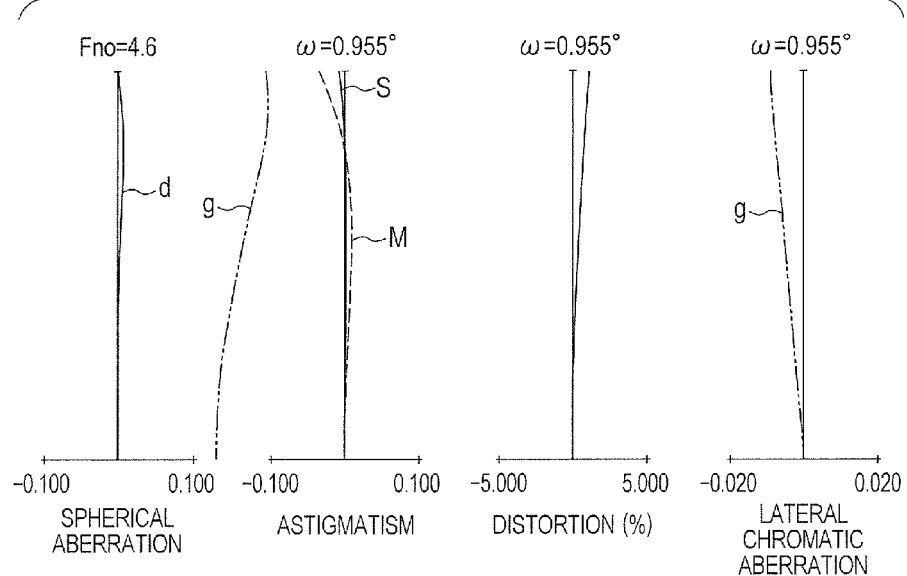
FIG. 2D is a diagram showing longitudinal aberrations in the zoom lens of Embodiment 1 at a telephoto end.

FIG. 1 is a sectional view of a zoom lens according to Embodiment 1 of the present invention at the wide angle end (focal length f=4.52 mm). FIGS. 2A to 2D are diagrams showing aberrations in the zoom lens according to Embodiment 1 of the present invention at the wide angle end, a first middle focal length (focal length f=9.01 mm), a second middle focal length (focal length f=37.69 mm), and a telephoto end (focal length f=180.02 mm), respectively. The zoom lens of Embodiment 1 has a zoom ratio of 39.85 and an f-number of 1.65 to 4.60.

Figure 3:
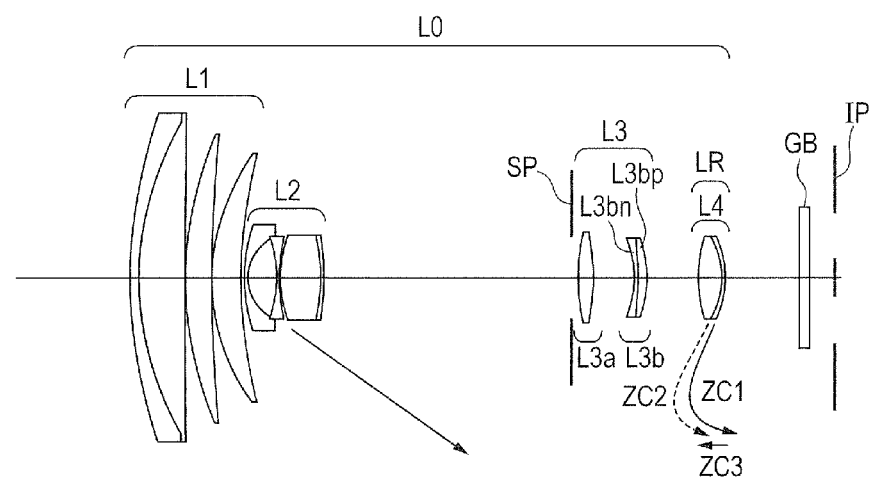
FIG. 3 is a sectional view of a zoom lens according to Embodiment 2 at the wide angle end, focusing at infinity.
Figure 4A:
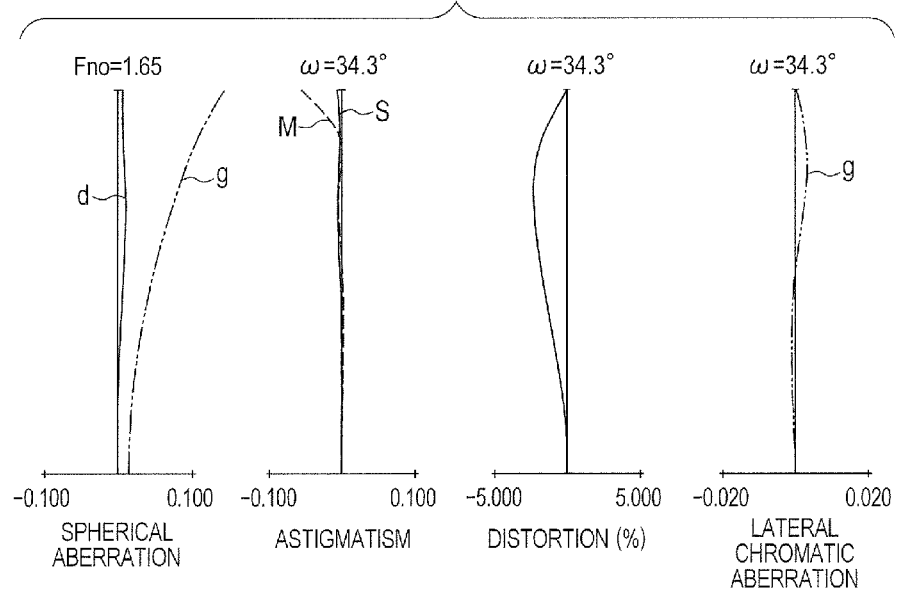
FIG. 4A is a diagram showing longitudinal aberrations in the zoom lens of Embodiment 2 at the wide angle end.
Figure 4B:
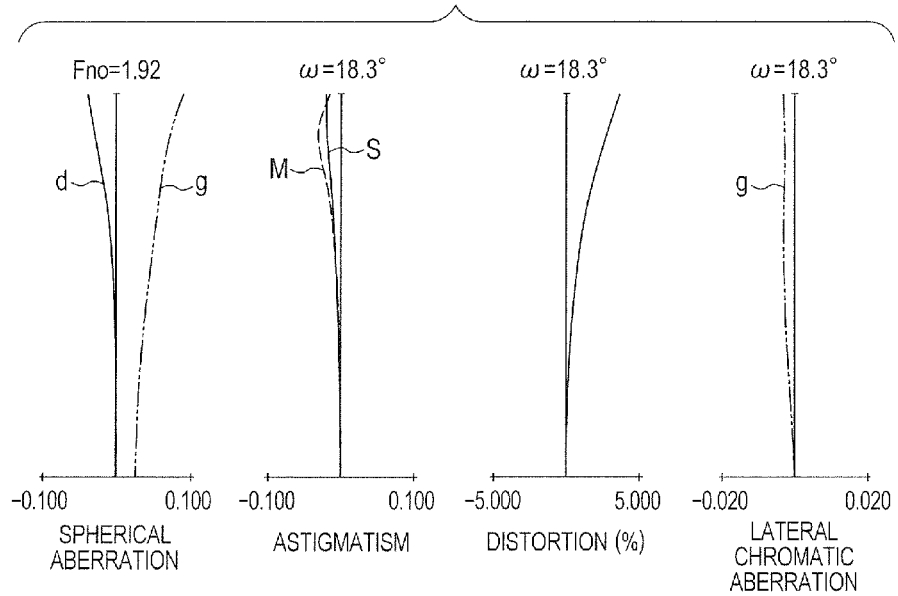
FIG. 4B is a diagram showing longitudinal aberrations in the zoom lens of Embodiment 2 at the first middle focal length.
Figure 4C:
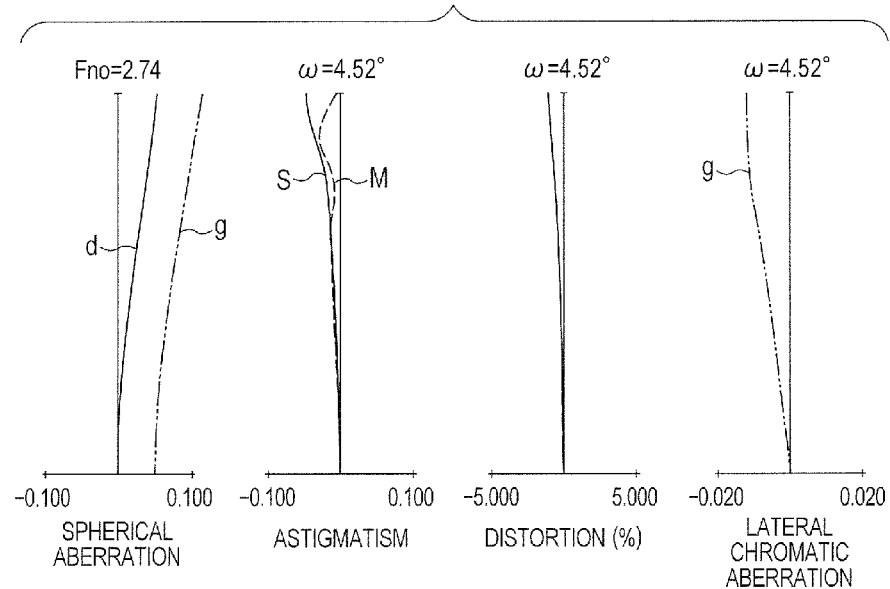
FIG. 4C is a diagram showing longitudinal aberrations in the zoom lens of Embodiment 2 at the second middle focal length.
Figure 4D:
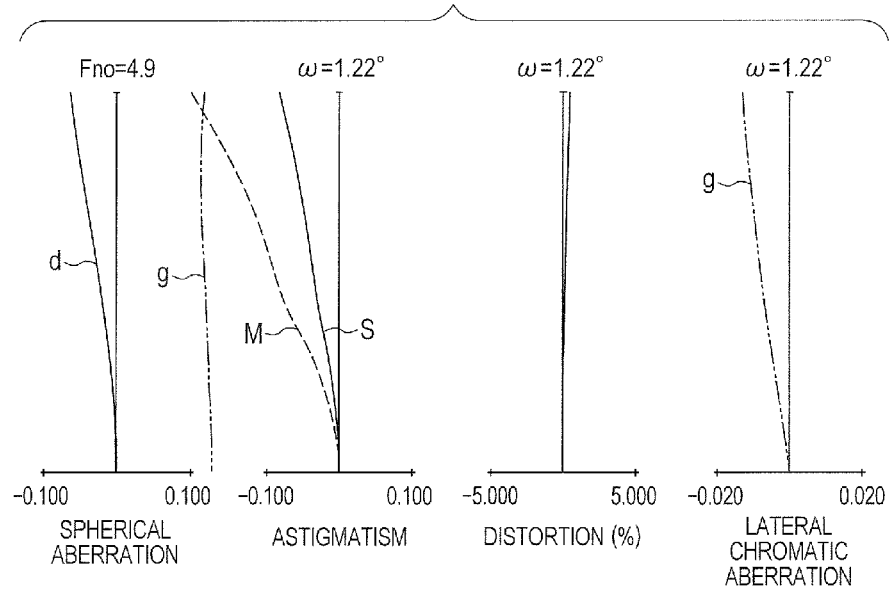
FIG. 4D is a diagram showing longitudinal aberrations in the zoom lens of Embodiment 2 at the telephoto end.

FIG. 3 is a sectional view of a zoom lens according to Embodiment 2 of the present invention at the wide angle end (focal length f=4.40 mm). FIGS. 4A to 4D are diagrams showing aberrations in the zoom lens according to Embodiment 2 of the present invention at the wide angle end, the first middle focal length (focal length f=9.06 mm), the second middle focal length (focal length f=37.93 mm), and the telephoto end (focal length f=140.95 mm), respectively. The zoom lens of Embodiment 2 has a zoom ratio of 32.01 and an f-number of 1.65 to 4.90.

Figure 5:
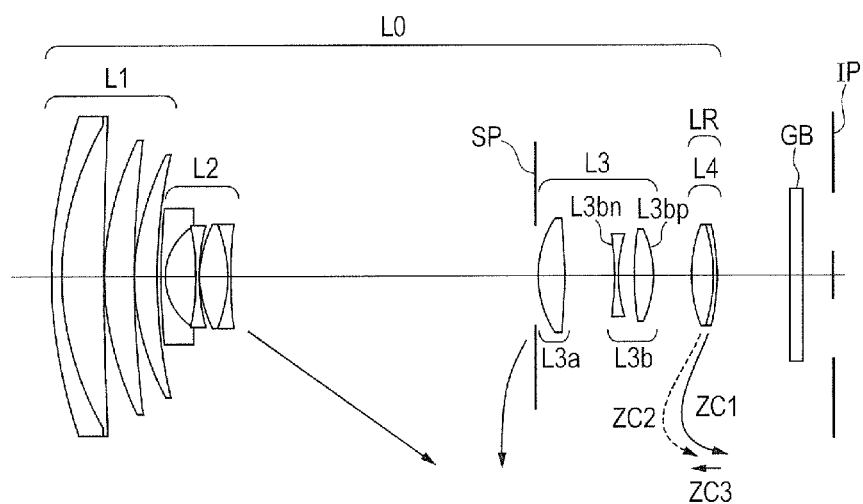
FIG. 5 is a sectional view of a zoom lens according to Embodiment 3 at the wide angle end, focusing at infinity.
Figure 6A:
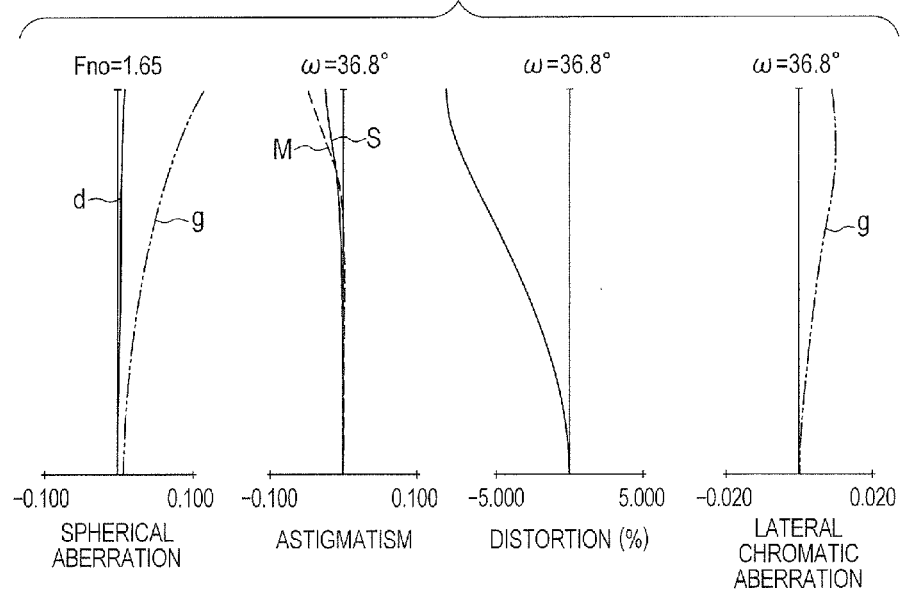
FIG. 6A is a diagram showing longitudinal aberrations in the zoom lens of Embodiment 3 at the wide angle end.
Figure 6B:
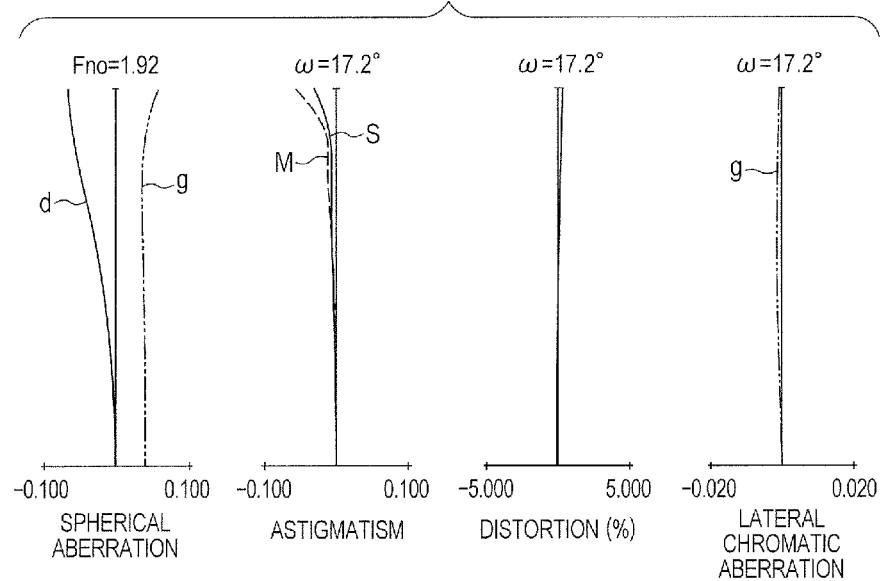
FIG. 6B is a diagram showing longitudinal aberrations in the zoom lens of Embodiment 3 at the first middle focal length.
Figure 6C:
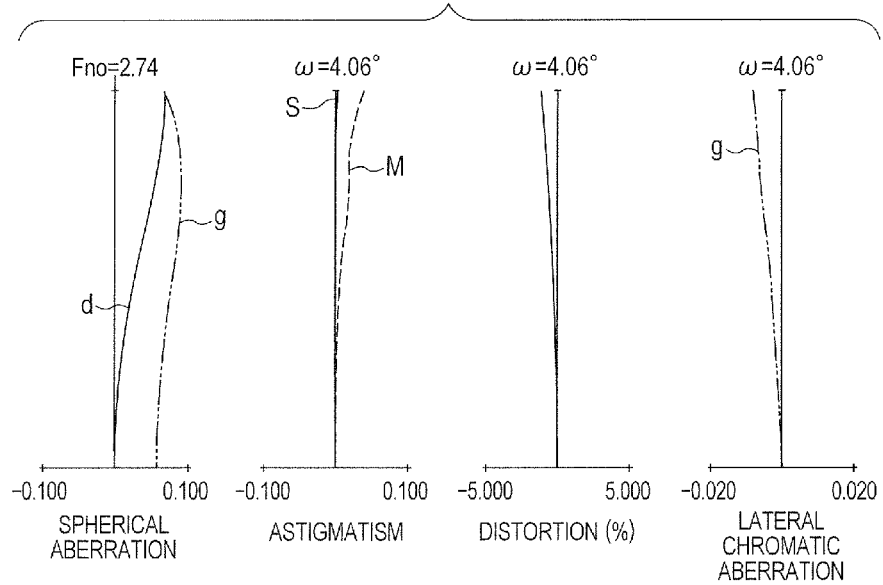
FIG. 6C is a diagram showing longitudinal aberrations in the zoom lens of Embodiment 3 at the second middle focal length.
Figure 6D:
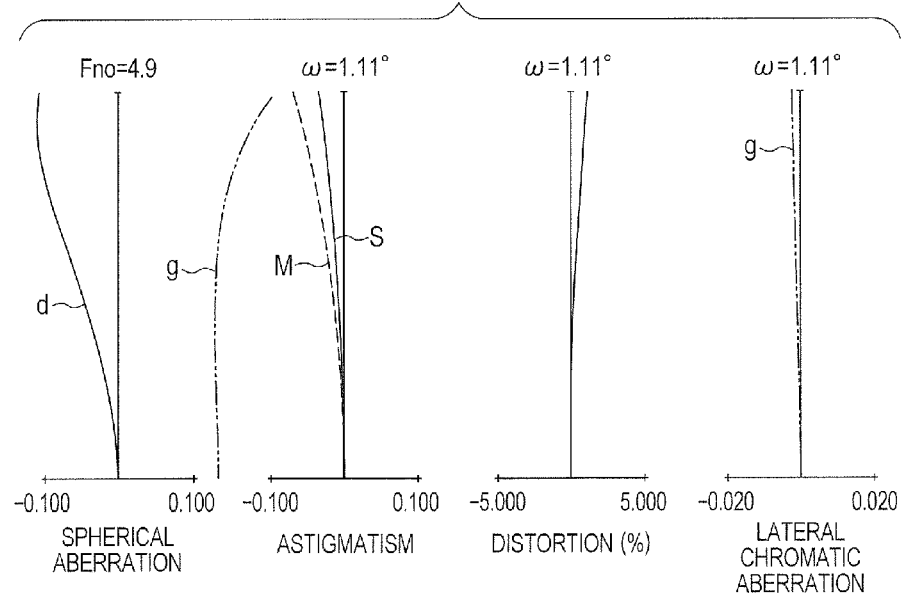
FIG. 6D is a diagram showing longitudinal aberrations in the zoom lens of Embodiment 3 at the telephoto end.

FIG. 5 is a sectional view of a zoom lens according to Embodiment 3 of the present invention at the wide angle end (focal length f=4.00 mm). FIGS. 6A to 6D are diagrams showing aberrations in the zoom lens according to Embodiment 3 of the present invention at the wide angle end, the first middle focal length (focal length f=9.71 mm), the second middle focal length (focal length f=42.23 mm), and the telephoto end (focal length f=155.31 mm), respectively. The zoom lens of Embodiment 3 has a zoom ratio of 38.80 and an f-number of 1.65 to 4.90.

Figure 7:
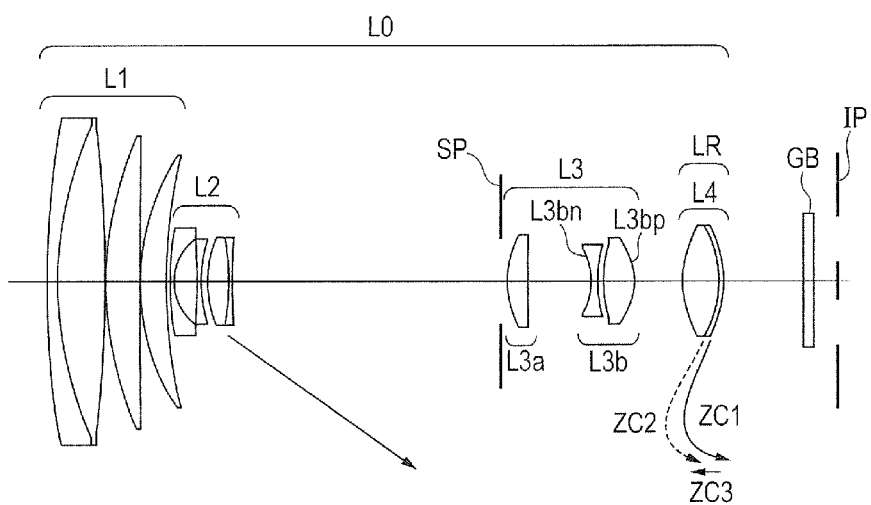
FIG. 7 is a sectional view of a zoom lens according to Embodiment 4 at the wide angle end, focusing at infinity.
Figure 8C:
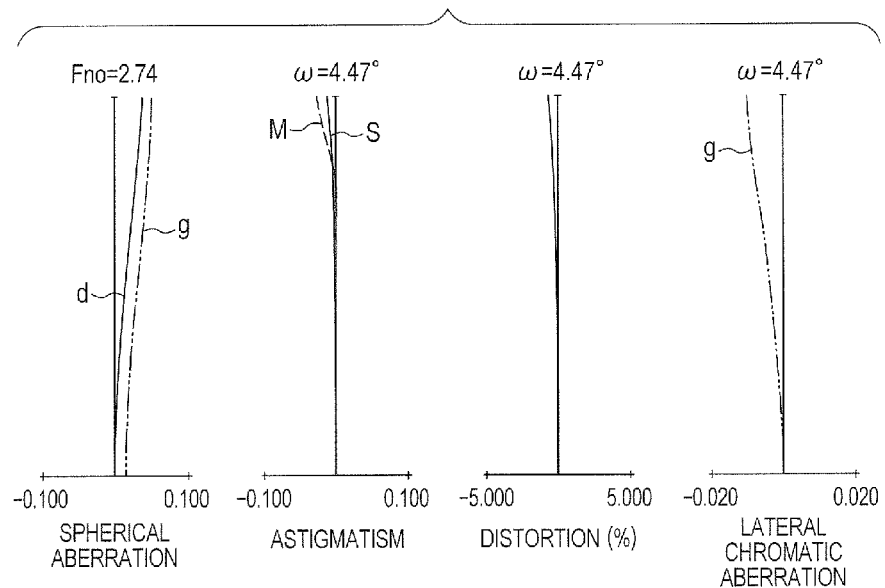
FIG. 8C is a diagram showing longitudinal aberrations in the zoom lens of Embodiment 4 at the second middle focal length.
Figure 8D:
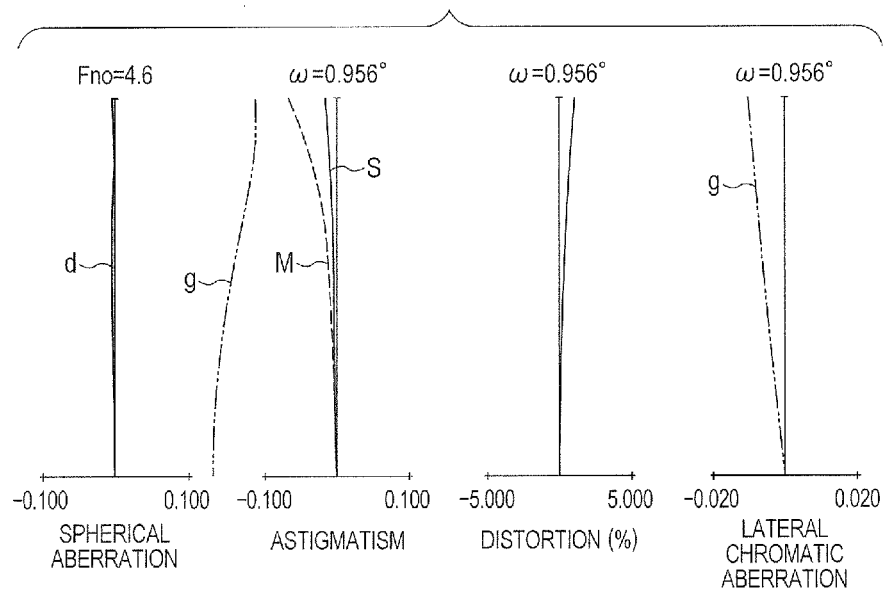
FIG. 8D is a diagram showing longitudinal aberrations in the zoom lens of Embodiment 4 at the telephoto end.

FIG. 7 is a sectional view of a zoom lens according to Embodiment 4 of the present invention at the wide angle end (focal length f=4.63 mm). FIGS. 8A to 8D are diagrams showing aberrations in the zoom lens according to Embodiment 4 of the present invention at the wide angle end, the first middle focal length (focal length f=9.27 mm), the second middle focal length (focal length f=38.37 mm), and the telephoto end (focal length f=179.82 mm), respectively. The zoom lens of Embodiment 4 has a zoom ratio of 38.80 and an f-number of 1.65 to 4.60.

Figure 9:
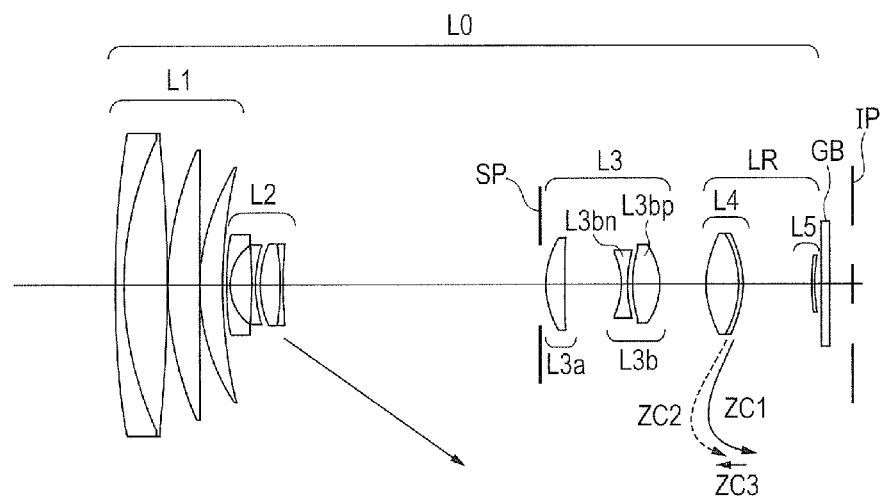
FIG. 9 is a sectional view of a zoom lens according to Embodiment 5 at the wide angle end, focusing at infinity.
Figure 10A:
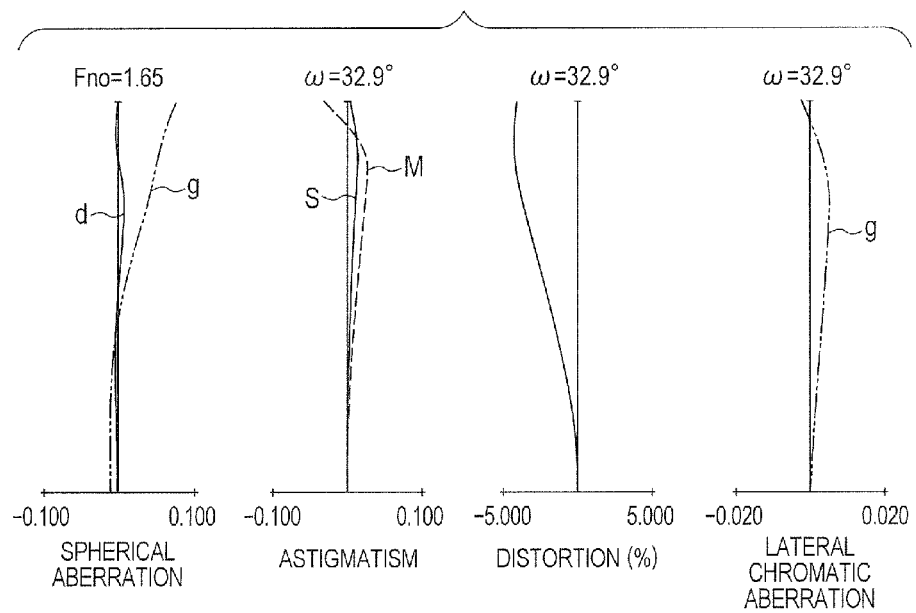
FIG. 10A is a diagram showing longitudinal aberrations in the zoom lens of Embodiment 5 at the wide angle end.
Figure 10B:
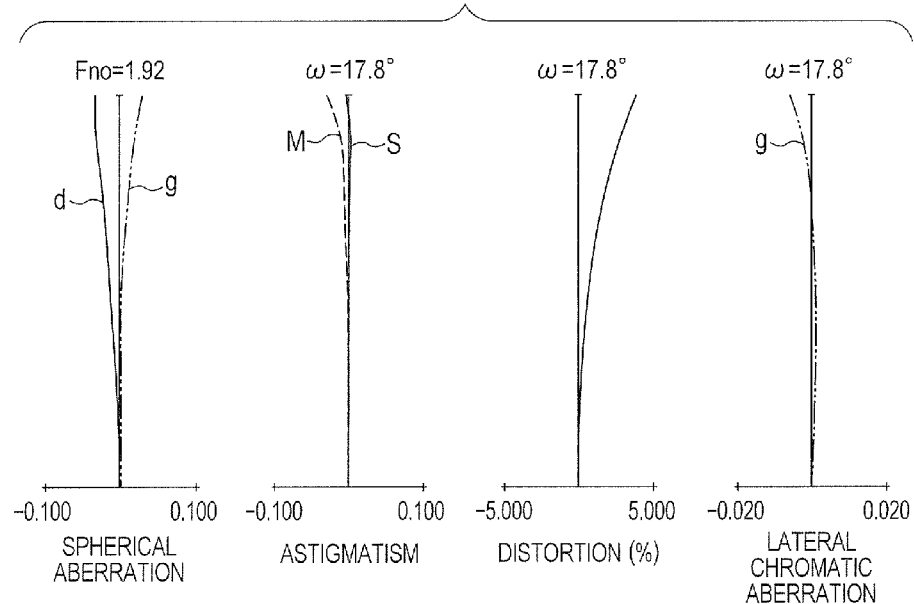
FIG. 10B is a diagram showing longitudinal aberrations in the zoom lens of Embodiment 5 at the first middle focal length.
Figure 10C:
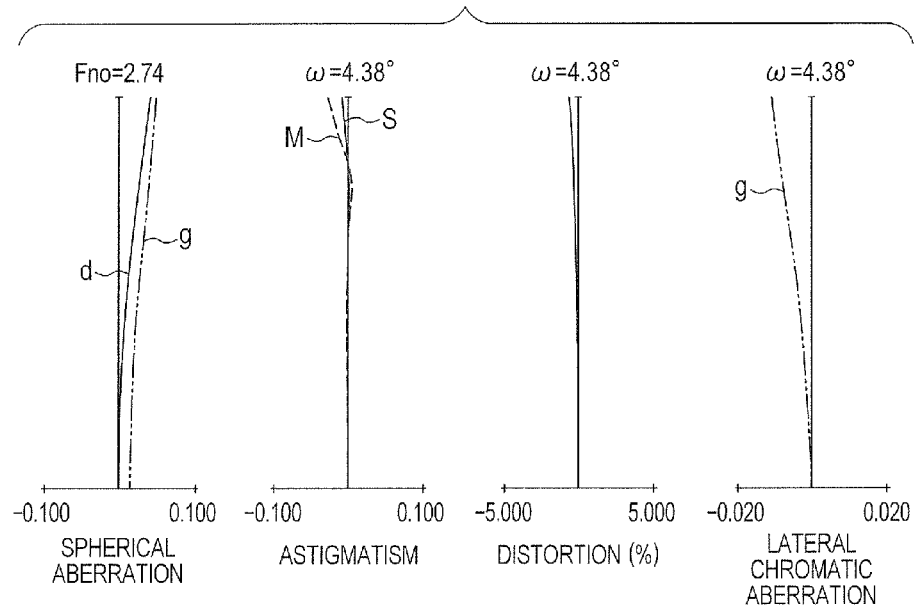
FIG. 10C is a diagram showing longitudinal aberrations in the zoom lens of embodiment 5 at the second middle focal length.
Figure 10D:
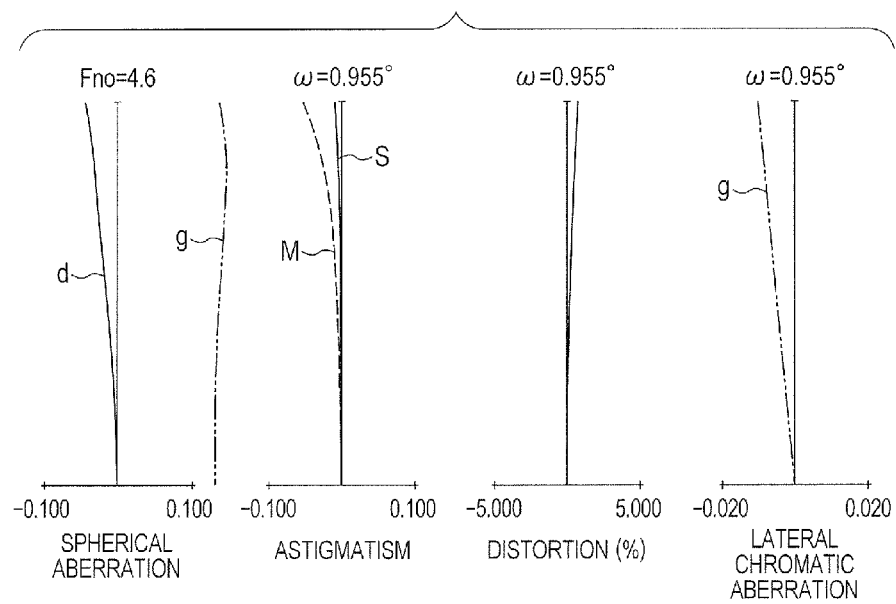
FIG. 10D is a diagram showing longitudinal aberrations in the zoom lens of Embodiment 5 at the telephoto end.
Figure 11A:
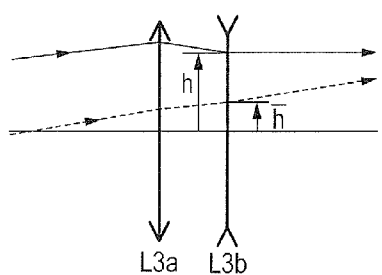
FIG. 11A is a diagram schematically showing paraxial rays passing through a third lens unit of a zoom lens of the present invention.
Figure 11B:
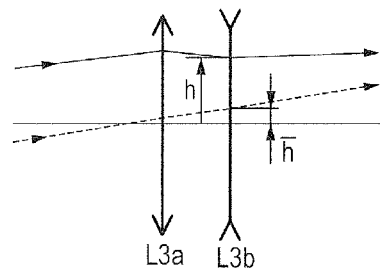
FIG. 11B is a diagram schematically showing paraxial rays passing through the third lens unit of the zoom lens of the present invention.
Figure 12:
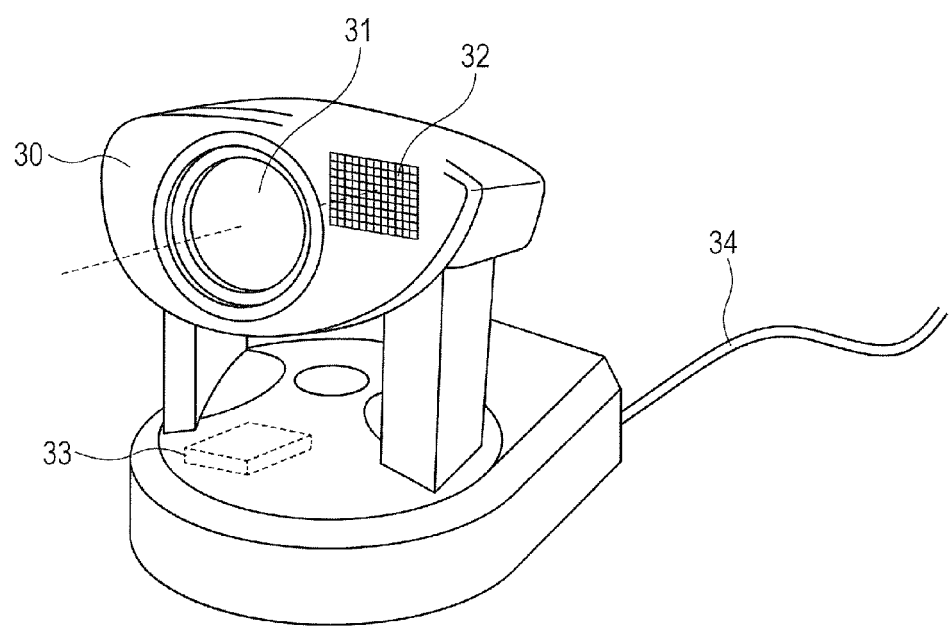
FIG. 12 is a diagram showing an image pickup apparatus including the zoom lens of the present invention.

FIG. 9 is a sectional view of a zoom lens according to Embodiment 5 of the present invention at the wide angle end (focal length f=4.64 mm). FIGS. 10A to 10D are diagrams showing aberrations in the zoom lens according to Embodiment 5 of the present invention at the wide angle end, the first middle focal length (focal length f=9.33 mm), the second middle focal length (focal length f=39.14 mm), and the telephoto end (focal length f=179.99 mm), respectively. The zoom lens of Embodiment 5 has a zoom ratio of 38.80 and an f-number of 1.65 to 4.60. FIGS. 11A and 11B are diagrams schematically showing paraxial rays passing through the third lens unit of the zoom lens of the present invention. FIG. 12 is a schematic diagram showing a main part of an image pickup apparatus of the present invention.

The zoom lens of the present invention is for use in an image pickup apparatus such as a digital camera, a video camera, or a silver-halide film camera. In the sectional views of the zoom lenses, the left side is the front (the object side or the zoom-in side), and the right side is the back (the image side or the zoom-out side). In the sectional views of the zoom lenses, each lens unit is denoted by Li where "i" is the ordinal number of the lens unit from the object side to the image side. "LR" denotes the rear lens group consisting of one or more lens units.

Next, characteristics of the zoom lenses of Embodiments 1 to 5 are described. In the sectional views of the zoom lenses of the embodiments, "L1" denotes the first lens unit having a positive refractive power, "L2" denotes the second lens unit having a negative refractive power, and "L3" denotes the third lens unit having a positive refractive power. The third lens unit L3 consists of a first lens sub-unit L3a having a positive refractive power and being located on the object side and a second lens sub-unit L3b having a negative refractive power and being located on the image side. The first lens sub-unit L3a and the second lens sub-unit L3b have an air interval therebetween which is the largest air interval within the third lens unit L3. "LR" denotes the rear lens group.

"L4" denotes a fourth lens unit having a positive refractive power, and "L5" denotes a fifth lens unit having a negative refractive power. "SP" denotes an f-number determination member acting as an aperture stop that determines the maximum aperture (hereinafter, the f-number determination member is referred to as an "aperture stop").

"GB" denotes an optical block such as an optical filter, a face plate, a crystal low-pass filter, an infrared cut filter, or the like. "IP" denotes an image plane. When the zoom lens is used as an image pickup optical system for a video camera or a digital still camera, the image pickup surface of a solid-state image pickup element (photoelectric conversion element), such as a CCD sensor or a CMOS sensor, is placed at the image plane IP. When the zoom lens is used as an image pickup optical system for a silver-halide film camera, a photosensitive surface, which is equivalent to a film plane, is placed at the image plane IP. The arrows in the sectional views indicate loci of movements of the lens units when zooming from the wide angle end to the telephoto end.

The zoom lens of each embodiment employs rear focus, where focus is provided by the fourth lens unit L4 moving on the optical axis. For the fourth lens unit L4, a solid curve ZC1 represents a locus of movement of the fourth lens unit L4 to correct image plane variation caused by zooming when focusing at infinity, and a dotted curve ZC2 represents a locus of movement of the fourth lens unit L4 to correct image plane variation caused by zooming when focusing for a close-up object. When the focus is changed from infinity to close-up at the telephoto end, the fourth lens unit L4 moves to the abject side as shown with arrow ZC3.

In the embodiments, the wide angle end and the telephoto end refer to available ends of the zoom range in which the zoom lens units can move on a mechanical optical axis. In addition, a middle focal length 1 refers to a middle focal length closer to the wide angle end, and a middle focal length 2 refers to a middle focal length closer to the telephoto end. In a part of each aberration diagram showing spherical aberration, solid line "d" denotes a d-line (wavelength 587.6 nm), and two-dot chain line "g" denotes a g-line (wavelength 435.8 nm). In a part showing astigmatism, broken line "M" denotes a meridional image plane at d-line, and solid line "S" denotes a sagittal image plane at d-line. The solid line in a part showing distortion represents a d-line. In a part showing lateral chromatic aberration, the two-dot chain line represents a g-line. "Fno" denotes an f-number, and "ω" denotes a half-angle of view (degrees).

Known conventional zoom lenses aiming to obtain a high zoom ratio include a four-element zoom lens including four lens units having positive, negative, positive, and positive refractive powers, respectively, and a five-element zoom lens including five lens units having positive, negative, positive, positive, and negative refractive powers, respectively. Zoom lenses having such configurations perform zooming by moving the second lens unit L2 having a negative refractive power along the optical axis with the first lens unit L1 having a positive refractive power not moving. Then, the fourth lens unit L4 having a positive refractive power moves along the optical axis to compensate for image plane variation caused by the zooming.

When a high zoom ratio is aimed in a zoom lens having the above zoom configuration, the second lens unit L2 having a negative refractive power has to move a longer distance for zooming. Then, the distance between the second lens unit L2 and the third lens unit L3 is increased. As a result, the diameter of light beam incident on the third lens unit L3 increases in a zoom range from the wide angle end to the middle focal length 1 closer to the wide angle end, which consequently increases the amount of aberration caused within the third lens unit L3.

The refractive power and lens configuration of the third lens unit L3 largely affect the optical performance of the zoos lens in a zoom range from the wide angle end to the middle focal length 1 closer to the wide angle end. In other words, in order to deliver high optical performance over the entire zoom range, it is important to appropriately set the refractive power and lens configuration of the third lens unit L3.

FIGS. 11A and 11B are diagrams schematically showing paraxial rays passing through the first lens sub-unit L3a and the second lens sub-unit L3b constituting the third lens unit L3 of the zoom lens having the above-described zoom configuration, FIG. 11A showing the wide angle end and FIG. 11B showing the middle focal length 1 closer to the wide angle end. In each diagram, the solid line represents an axial marginal ray, and the broken line represents an off-axial principal ray. The heights, from the optical axis, of the axial marginal ray and the off-axial principal ray entering the second lens sub-unit L3b are denoted by "h" and "h−", respectively. As shown in FIGS. 11A and 11B, the incident height h and the incident height h− on the second lens sub-unit L3b are changed from the incident heights on the first lens sub-unit L3a.

The present invention uses these changes in the incident heights to reduce aberration variation in the zoom range from the wide angle end to the middle focal length 1 closer to the wide angle end. In the zoom lens of the present invention, the third lens unit L3 has the first lens sub-unit L3a having a positive refractive power and being located on the object side of the largest air interval within the third lens unit L3 and the second lens sub-unit L3b having a negative refractive power and being located on the image side of the largest air interval.

When the first lens sub-unit L3a and the second lens sub-unit L3b are thus spaced apart from each other, in the zoom range from the wide angle end to the middle focal length 1 closer to the wide angle end, the incident height h and the incident height h− of the rays entering the second lens sub-unit L3b having a negative refractive power can be changed more greatly than when these sub-units are close to each other. Thus, aberrations occurring at the second lens sub-unit L3b having a negative refractive power are largely varied in comparison to aberration variation occurring at the first lens sub-unit L3a having a positive refractive power.

Aberration variation is therefore reduced for spherical aberration and field curvature which tend to be corrected insufficiently by the third lens unit L3 having a positive refractive power. In addition, the configuration of the third lens unit L3 in which the second lens sub-unit L3b has the negative lens G3bn and the positive lens G3bp in order from the object side to the image side allows reduction in variation in spherical aberration and astigmatism as well as favorable correction of axial chromatic aberration, in the zoom range from the wide angle end and the middle focal length 1.

The zoom lenses of the present invention satisfy the following condition:

$$-2.0 < R3bn1/f3 < -0.1 \quad (1)$$

$$0.15 < D3ab/Dsi < 0.30 \quad (2)$$

where R3bn1 is the radius of curvature of an object-side surface of the negative lens G3bn, f3 is the focal length of the third lens unit L3, D3ab is an air interval between the first lens sub-unit L3a and the second lens sub-unit L3b, and Dsi is a distance combining a back focus in air and a distance from the aperture stop SP to the lens surface closest to the image side at the wide angle end.

Next, technical meanings of the above conditions are described. Conditions (1) and (2) are defined to obtain a zoom lens that offers high optical performance over the entire zoom range. Condition (1) defines an appropriate ratio of the radius of curvature of the object-side surface of the negative lens G3bn to the focal length of the third lens unit L3. If the ratio of Condition (1) exceeds the upper limit defined therein, the curvature of the object-side concave surface of the negative lens G3bn is too steep (i.e., the radius of curvature of the concave surface is too small). This means that the negative refractive power of the second lens sub-unit L3b is too strong relative to the positive refractive power of the third lens unit L3 (the negative refractive power is too large in absolute value).

Then, the second lens sub-unit L3b having a negative refractive power has to largely diffuse the rays converged by the first lens sub-unit L3a having a positive refractive power. This increases aberration variation within the zoom range from the wide angle end to the middle focal length 1, resulting in excessive correction of spherical aberration and field curvature at the middle focal length 1.

If the ratio of Condition (1) falls below the lower limit defined therein, the curvature of the object-side concave surface of the negative lens G3bn is too gentle (i.e., the radius of curvature of the concave surface is too large). This means that the negative refractive power of the second lens sub-unit L3b is too weak relative to the positive refractive power of the third lens unit L3 (the negative refractive power is too small in absolute value). Then, the second lens sub-unit L3b having a negative refractive power cannot sufficiently diffuse the rays converged by the first lens sub-unit L3a having a positive refractive power. This increases aberration variation across the zoom range from the wide angle end to the middle focal length 1, resulting in insufficient correction of spherical aberration and field curvature at the middle focal length 1.

Condition (2) defines an appropriate ratio of the air interval between the first lens sub-unit L3a and the second lens sub-unit L3b to the distance from the aperture stop SP to the image plane at the wide angle end. If an optical block (plane-parallel plate) exists between the last lens surface and the image surface, the length of the optical block is converted to a length in air. If the ratio of Condition (2) exceeds the upper limit defined therein, the amount by which the fourth lens unit L4 moves for zooming (stroke) is restricted. Thus, the refractive power of the fourth lens unit L4 has to be increased to be able to correct image plane variation caused by zooming. This results in an increase in variation in the various aberrations during zooming.

If the ratio of Condition (2) falls below the lower limit defined therein, the incident height of the axial marginal ray and the incident height of the off-axial principal ray do not largely change between the first lens sub-unit L3a and the second lens sub-unit L3b in the zoom range from the wide angle end to the middle focal length 1. This makes it difficult for the third lens unit L3 to correct spherical aberration and field curvature. In addition, the distance between the aperture stop SP and the image plane becomes too long, increasing the size of the entire lens system.

In each embodiment, preferably, numbers in Conditions (1) and (2) may be set as follows:

$$-1.50 < R3bn1/f3 < -0.15 \tag{1a}$$

$$0.15 < D3ab/Dsi < 0.25. \tag{2a}$$

More preferably, numbers in Conditions (1a) and (2a) may be set as follows:

$$-1.2 < R3bn1/f3 < -0.2 \tag{1b}$$

$$0.15 < D3ab/Dsi < 0.23. \tag{2b}$$

The zoom lenses according to the above embodiments can offer a high zoom ratio as well as high optical performance over the entire zoom range.

Still more preferably, the zoom lens of each embodiment may satisfy at least one of the following conditions:

$$0.2 < f3a/f3 < 1.0 \tag{3}$$

$$-2.2 < f3b/f3 < -0.2 \tag{4}$$

$$0.1 < f1/ft < 1.0 \tag{5}$$

$$0.5 < (\beta2t/\beta2w)/(ft/fw) < 10.0 \tag{6}$$

$$1.0 < f3/f4 < 3.0 \tag{7}$$

where f3a is the focal length of the first lens sub-unit L3a, f3b is the focal length of the second lens sub-unit L3b, f1 is the focal length of the first lens unit L1, ft is the focal length of the entire system at the telephoto end, β2t is the lateral magnification of the second lens unit L2 at the telephoto end, β2w is the lateral magnification of the second lens unit L2 at the wide angle end, fw is the focal length of the entire system at the wide angle end, and f4 is the focal length of the fourth lens unit L4.

Next, technical meanings of the above conditions are described. Condition (3) defines an appropriate ratio of the focal length of the first lens sub-unit L3a to the focal length of the third lens unit L3. The focal length of the first lens sub-unit L3a, i.e., the positive refractive power thereof, is appropriately set for the third lens unit L3 that the axial marginal ray and the off-axial principal ray enter at large incident heights. The first lens sub-unit L3a having such an appropriate focal length enables converged rays to enter the second lens sub-unit L3b at appropriate angles and heights, so that spherical aberration and field curvature can be favorably corrected.

If the ratio of Condition (3) exceeds the upper limit defined therein, the focal length of the first lens sub-unit L3a is too large relative to the fecal length of the third lens unit L3. This means that the positive refractive power of the first lens sub-unit L3a is too weak relative to the positive refractive power of the third lens unit L3. This weakens the light convergence effect, produced by the first lens sub-unit L3a having a positive refractive power, which causes excessive correction of spherical aberration and field curvature in the zoom range from the wide angle end to the middle focal length 1. As a result, such a zoom lens is hindered from delivering high optical performance over the entire zoom range.

If the ratio of Condition (3) falls below the lower limit defined therein, the focal length of the first-lens sub-unit L3a is too small relative to the focal length of the third lens unit L3. This means that the positive refractive power of the first lens sub-unit L3a is too strong relative to the positive refractive power of the third lens unit L3. This strengthens the light convergence effect produced by the first lens sub-unit L3a having a positive refractive power, which causes insufficient correction of spherical aberration and field curvature in the zoom range from the wide angle end to the middle focal length 1. As a result, such a zoom lens is hindered from delivering high optical performance over the entire zoom range.

In each embodiment, more preferably in view of aberration correction, numbers in Condition (3) may be set as follows:

$$0.3 < f3a/f3 < 0.8. \tag{3a}$$

Still more preferably, numbers in Condition (3a) may be set as follows:

$$0.4 < f3a/f3 < 0.6. \tag{3b}$$

Condition (4) defines an appropriate ratio of the focal length of the second lens sub-unit L3b to the focal length of the third lens unit L3. The focal length of the second lens sub-unit L3b, i.e., the negative refractive power thereof, is appropriately set for the third lens unit L3 that the axial marginal ray and the off-axial principal ray enter at large incident heights. The second lens sub-unit L3b having such an appropriate focal length can advantageously diffuse converged rays emitted from the first lens sub-unit L3a, so that spherical aberration and field curvature can be favorably corrected.

If the ratio of Condition (4) exceeds the upper limit defined therein, the negative focal length of the second lens sub-unit L3b is too small (in absolute value) relative to the focal length of the third lens unit L3. This means that the negative refractive power of the second lens sub-unit L3b is too strong (or too large in absolute value) relative to the positive refractive power of the third lens unit L3. This causes excessive correction of spherical aberration and field curvature in the zoom range from the wide angle end to the middle focal length 1. As a result, such a zoom lens is hindered from delivering high optical performance over the entire zoom range.

If the ratio of Condition (4) falls below the lower limit defined therein, the negative focal length of the second lens sub-unit L3b is too large (in absolute value) relative to the focal length of the third lens unit L3. This means that the negative refractive power of the second lens sub-unit L3b is too weak relative to the positive refractive power of the third lens unit L3. Or, an absolute value of the negative refractive power of the second lens sub-unit L3b is too small relative to an absolute value of the positive refractive power of the third lens unit L3. This causes insufficient correction of spherical aberration and field curvature in the zoom range from the wide angle end to the middle focal length 1. As a result, such a zoom lens is hindered from delivering high optical performance over the entire zoom range.

In each embodiment, more preferably in view of aberration correction, numbers in Condition (4) may be set as follows:

$$-1.4 < f3b/f3 < -0.4 \quad (4a)$$

Still more preferably, numbers in Condition (4a) may be set as follows:

$$-1.1 < f3b/f3 < -0.6 \quad (4b)$$

Condition (5) defines an appropriate ratio of the focal length of the first lens unit L1 to the focal length of the entire system at the telephoto end. When the focal length of a zoom lens at the telephoto end is increased with its focal length at the wide angle end unchanged, the zoom lens can offer a high zoom ratio. However, to deliver high optical performance at the telephoto end, the various aberrations have to be reduced in the first lens unit L1 where the diameter of incident beam is the largest. An appropriate ratio of the focal length of the first lens unit L1 to the focal length of the entire system at the telephoto end facilitates favorable correction of spherical aberration and chromatic aberration.

If the ratio of Condition (5) exceeds the upper limit defined therein, the focal length of the first lens unit L1 is too large, or the positive refractive power thereof is too weak, relative to the focal length of the entire system at the telephoto end. This means that the focal length of the entire lens system is too large, which causes size increase of the entire lens system. If the ratio of Condition (5) falls below the lower limit defined therein, the focal length of the first lens unit L1 is too small, or the positive refractive power thereof is too strong, relative to the focal length of the entire system at the telephoto end. Then, spherical aberration and chromatic aberration cannot be favorably corrected at the telephoto end.

In each embodiment, more preferably in view of aberration correction, numbers in Condition (5) may be set as follows:

$$0.15 < f1/ft < 0.70 \quad (5a)$$

Still more preferably, numbers in Condition (5a) may be set as follows:

$$0.2 < f1/ft < 0.4 \quad (5b)$$

Condition (6) defines an appropriate ratio of the magnification ratio of the second lens unit L2 (the ratio of the telephoto lateral magnification to the wide-angle lateral magnification of the second lens unit L2) to the zoom ratio of the entire system which is represented by the ratio of the telephoto focal length to the wide-angle focal length of the entire system. The magnification ratio of the second lens unit L2 greatly affects the amount of movement for zooming and the refractive powers of the lens units disposed in the image side of the second lens unit L2, namely, the third lens unit L3 and the fourth lens unit L4. An appropriate magnification ratio of the second lens unit L2 thus allows reduction in the overall lens length, reduction in the effective diameter of the front lens, and high optical performance over the entire zoom range.

If the ratio of Condition (6) exceeds the upper limit defined therein, the magnification ratio of the second lens unit L2 is too large relative to the zoom ratio of the entire system. In other words, the second lens unit L2 is responsible for an excessively large part of the zooming. This consequently requires the second lens unit L2 to have a higher refractive power or to move a longer distance for zooming. Increasing the refractive power of the second lens unit L2 makes it difficult to reduce aberration variation in the entire zoom range. Increasing the amount by which the second lens unit L2 moves for zooming makes it necessary to excessively widen the interval between the first lens surface and the aperture stop SP, which consequently increases the overall lens length and the effective diameter of the front lens.

If the ratio of Condition (6) falls below the lower limit defined therein, the magnification ratio of the second lens unit L2 is too small relative to the zoom ratio of the entire system. In other words, the second lens unit L2 is responsible for an excessively small part of the zooming. Then, the positive refractive powers of the third lens unit L3 and the fourth lens unit L4 have to be increased excessively so that the third lens unit L3 and the fourth lens unit L4 may be responsible for larger parts of the zooming. Excessive increase in their positive refractive powers hinders correction of spherical aberration and field curvature.

In each embodiment, more preferably in view of aberration correction, numbers in Condition (6) may be set as follows:

$$0.7 < (\beta 2t/\beta 2w)/(ft/fw) < 8.5 \quad (6a)$$

Still more preferably, numbers in Condition (6a) may be set as follows:

$$1.0 < (\beta 2t/\beta 2w)/(ft/fw) < 7.0 \quad (6b)$$

Condition (7) defines an appropriate ratio of the focal length of the third lens unit L3 to the focal length of the fourth lens unit L4. Aberration variation is reduced in the entire zoom range when an appropriate ratio is maintained between the focal length of the fourth lens unit L3 moving to correct image plane variation caused by zooming and the focal length of the third lens unit L3 disposed on the object side of the fourth lens unit L4.

If the ratio of Condition (7) falls below the lower limit defined therein, the focal length of the third lens unit L3 is too small relative to the focal length of the fourth lens unit L4. In other words, the refractive power of the third lens unit L3 is excessively strong relative to that of the fourth lens unit L4. When the positive refractive power of the third lens unit L3 is too strong, variation in spherical aberration and field curvature increases in the zoom range from the wide angle end to the middle focal length 1. This increases the burden on the fourth lens unit L4 for correcting these aberrations. Thus, the fourth lens unit L4 cannot maintain a favorable balance in aberration variation correction between the above zoom range and the rest of the zoom range.

If the ratio of Condition (7) exceeds the upper limit defined therein, the focal length of the fourth lens unit L4 is too small relative to the focal length of the third lens unit L3. In other words, the refractive power of the fourth lens unit L4 is too strong relative to that of the third lens unit L3. The increase in the positive refractive power of the fourth lens unit L4 moving to correct image plane variation caused by zooming increases aberration variation in the entire zoom range. Furthermore, the decrease in the positive refractive power of the third lens unit L3 increases the effective diameter of the fourth lens unit L4.

In each embodiment, more preferably in view of aberration correction, numbers in Condition (7) may be set as follows:

$$1.2 < f3/f4 < 2.9. \tag{7a}$$

Still more preferably, numbers in Condition (7a) may be set as follows:

$$1.4 < f3/f4 < 2.8. \tag{7b}$$

In each embodiment, the lens units are configured as described above to obtain a high zoom ratio and high optical performance over the entire zoom range. In each embodiment, the fourth lens unit L4 may preferably be a cemented lens having a positive refractive power, formed by cementing a positive lens and a negative lens. This configuration enables reduction in variation in chromatic aberration occurring when the fourth lens unit L4 corrects image plane variation caused by zooming, and therefore contributes to high optical performance.

In each embodiment, the third lens unit L3 may preferably consist of at least one positive lens and at least one negative lens, and at least one of these lenses may preferably have aspherical surfaces on both sides. This facilitates favorable correction of spherical aberration and coma at the wide angle end, offering high optical performance.

Next, the configurations of the zoom lenses of Embodiments 1 to 5 are described. A zoom lens L0 of Embodiment 1 shown in FIG. 1 consists of, in order from the object side to the image side, the first lens unit L1 having a positive refractive power, the second lens unit L2 having a negative refractive power, the third lens unit L3 having a positive refractive power, and the rear lens group LR. The rear lens group LR consists of the fourth lens unit L4 having a positive refractive power. Zooming from the wide angle end to the telephoto end is performed by the second lens unit L2 moving to the image side.

The fourth lens unit L4 moves along a locus convex to the object side to correct image plane variation caused by zooming. The first lens unit L1, the aperture stop SP and the third lens unit L3 do not move for zooming.

Characteristics of the zoom lenses are described using numerical data sets given further below. In Embodiment 1, the first lens unit L1 corresponds to the 1st to 7th lens surfaces, and its lens closest to the object side is a cemented lens formed by cementing a positive lens and a negative lens. The second lens unit L2 corresponds to the 8th to 14th lens surfaces, and its lens closest to the image side is a cemented lens formed by cementing a positive lens and a negative lens. The aperture stop SP corresponds to the 15th surface. The third lens unit L3 corresponds to the 16th to 21st lens surfaces. The fourth lens unit L4 corresponds to the 22nd to 24th lens surfaces, and is a cemented lens formed by cementing a positive lens and a negative lens.

A description is now given of aberration-coefficient variation values for the lens surfaces of the third lens unit L3 of Embodiment 1 during zooming from the wide angle end to the middle focal length 1. Numerical Data 1 given further below shows coefficients related to spherical aberration and astigmatism, namely, a third-order spherical aberration coefficient I (spherical aberration), a third-order astigmatism coefficient III (astigmatism), a fifth-order spherical aberration coefficient I^ (marginal spherical aberration), and a fifth-order astigmatism coefficient III^ (marginal astigmatism). Numerical Data 1 demonstrates aberration-coefficient variation values for each lens surface of the third lens unit L3 resulting from zooming from the wide angle end to the middle focal length 1.

In Numerical Data 1, the 18th lens surface and the 19 th lens surface are, compared to the other lens surfaces, negatively large in their variations values for the third- and fifth-order spherical aberration coefficients and the third- and fifth-order astigmatism coefficients. The aberration-coefficient variation values for the 19th lens surface and the 20th lens surface cancel each other out because they are close values in absolute values with opposite signs. Thus, it is the 18th lens surface that is dominant in terms of variation in aberration coefficients of the third lens unit L3. The 18th lens surface is the object-side surface of the negative lens G3bn constituting the second lens sub-unit L3b and is a concave surface facing object side.

Thus, during zooming from the wide angle end to the middle focal length 1, the third- and fifth-order spherical aberration coefficients and the third- and fifth-order astigmatism coefficients of the 18th lens surface are thus varied negatively to thereby suppress positive variation of the spherical aberration coefficients and astigmatism coefficients of the entire lens system. This prevents the entire lens system from being corrected too insufficiently for spherical aberration and astigmatism at the middle focal length 1, and therefore allows favorable correction for these aberrations. As demonstrated in Table 1 given farther below, the zoom lens of Embodiment 1 satisfies all of Conditions (1) to (7) and can therefore offer a high zoom ratio and high optical performance over the entire zoom range.

A zoom lens L0 of Embodiment 2 shown in FIG. 3 has the same lens configurations as that of Embodiment 1, such as the number of lens units, the signs of the refractive powers of the lens units, and the loci of movements of the lens units during zooming. Focusing mechanism is also the same as that of Embodiment 1.

In Embodiment 2, the first lens unit L1 corresponds to the 1st to 7th lens surfaces, and its lens closest to the object side is a cemented lens formed by cementing a positive lens and a negative lens. The second lens unit L2 corresponds to the 8th to 14th lens surfaces, and its lens closest to the image side is a cemented lens formed by cementing a positive lens and a negative lens. The aperture stop SP corresponds to the 15th surface. The third lens unit L3 corresponds to the 16th to 20th lens surfaces, and its lens closest to the image side is a cemented lens formed by cementing a positive lens and a negative lens. The fourth lens unit L4 corresponds to the 21st to 23rd lens surfaces, and is a cemented lens formed by cementing a positive lens and a negative lens, A description is now given of aberration-coefficient variation values for the lens surfaces of the third lens unit L3 of Embodiment 2 resulting from zooming from the wide angle end to the middle focal length 1. Numerical Data 2 given further below shows coefficients related to spherical aberration and astigmatism, namely, a third-order spherical aberration coefficient I (spherical aberration), a third-order astigmatism coefficient III (astigmatism), a fifth-order spherical aberration coefficient I^ (marginal spherical aberration), and a fifth-order astigmatism coefficient III^ (marginal astigmatism). Numerical Data 2 demonstrates aberration-coefficient variation values for each lens surface of the third lens unit L3 during zooming from the wide angle end to the middle focal length 1.

In Numerical Data 2, the 18th lens surface is, compared to the other lens surfaces, negatively large in its variation value for the fifth-order spherical aberration coefficient. The 18th lens surface is the object-side lens surface of the negative lens G3bn constituting the second lens sub-unit L3b and is a concave surface facing object side. During zooming from the wide angle end to the middle focal length 1, the fifth-order spherical aberration coefficient of the 18 th lens stir face is thus varied negatively to thereby suppress positive variation of the spherical aberration coefficients of the entire lens system. This prevents the entire lens system from being corrected too insufficiently for spherical aberration at the middle focal length 1, and therefore allows favorable correction for the spherical aberration.

As demonstrated in Table 1 given further below, the zoom lens of Embodiment 2 satisfies all of Conditions (1) to (7) and can therefore offer a high zoom ratio and high optical performance over the entire zoom range.

A zoom lens L0 of Embodiment 3 shown in FIG. 5 has the same number of lens units and the same signs of the refractive powers of the lens units as that of Embodiment 1. Zooming from the wide angle end to the telephoto end is performed by the second lens unit L2 moving to the image side and the third lens unit L3 moving to the object side. Meanwhile, the fourth lens unit L4 moves along a locus convex to the object side to correct image plane variation caused by the zooming. Focusing mechanism is the same as that of Embodiment 1.

In Embodiment 3, the first lens unit L1 corresponds to the 1st to 7th lens surfaces, and its lens closest to the object side is a cemented lens formed by cementing a positive lens and a negative lens. The second lens unit L2 corresponds to the 8th to 14th lens surfaces, and its lens closest to the image side is a cemented lens formed by cementing a positive lens and a negative lens. The aperture stop SF corresponds to the 15th surface. The third lens unit L3 corresponds to the 16 th to 21st lens surfaces. The fourth lens unit L4 corresponds to the 22nd to 24th lens surfaces, and is a cemented lens formed by cementing a positive lens and a negative lens.

During zooming from the wide angle end to the telephoto end, while the second lens unit L2 moves to the image side linearly and the third lens unit L3 moves to the object side, the fourth lens unit L3 moves along a locus convex to the object side, making substantially a reciprocating motion.

A description is now given of aberration-coefficient variation values for the lens surfaces of the third lens unit L3 of Embodiment 3 resulting from zooming from the wide angle end to the middle focal length 1. Numerical Data 3 given further below shows coefficients related to spherical aberration and astigmatism, namely, a third-order spherical aberration coefficient I (spherical aberration), a third-order astigmatism coefficient III (astigmatism), a fifth-order spherical aberration coefficient I^ (marginal spherical aberration), and a fifth-order astigmatism coefficient III^ (marginal astigmatism). Numerical Data 3 demonstrates aberration-coefficient variation values for each lens surface of the third lens unit L3 resulting from zooming from the wide angle end to the middle focal length 1.

In Numerical Data 3, the 19th lens surface is, compared to the other lens surfaces, negatively large in its variation value for the fifth-order astigmatism coefficient. During zooming from the wide angle end to the middle local length 1, this negatively varied fifth-order astigmatism coefficient of the 19th lens surface causes excessive correction of field curvature in the lens entire system. Meanwhile, the 18th lens surface, which is the object-side surface of the negative lens G3bn constituting the second lens sub-unit L3b and is a concave surface facing object side, is negatively large in its variation value for the fifth-order spherical aberration coefficient, compared to the other lens surfaces.

During zooming from the wide angle end to the middle focal length 1, the fifth-order spherical aberration coefficient of the 18th lens surface is thus varied negatively so that spherical aberration may be excessively corrected in addition to the field curvature excessively corrected in the entire lens system. Degradation of optical performance is thereby prevented. As demonstrated in Table 1 given further below, the zoom lens of Embodiment 3 satisfies all of Conditions (1) to (7) and can therefore offer a high zoom ratio and high optical performance over the entire zoom range.

A zoom lens L0 of Embodiment 4 shown in FIG. 7 has the same lens configurations as that of Embodiment 1, such as the number of lens units, the signs of the refractive powers of the lens units, and the loci of movements of the lens units during zoom. Focusing mechanism is also the same as that of Embodiment 1.

In Embodiment 4, the first lens unit L1 corresponds to the 1st to 7th lens surfaces, and its lens closest to the object side is a cemented lens formed by cementing a positive lens and a negative lens. The second lens unit L2 corresponds to the 8th to 14th lens surfaces, and its lens closest to the image side is a cemented lens formed by cementing a positive lens and a negative lens. The aperture stop SP corresponds to the 15th surface. The third lens unit L3 corresponds to the 16th to 21st lens surfaces. The fourth lens unit L4 corresponds to the 22nd to 24th lens surfaces, and is a cemented lens formed by cementing a positive lens and a negative lens.

A description is now given of aberration-coefficient variation values for the lens surfaces of the third lens unit L3 of Embodiment 4 during zooming from the wide angle end to the middle focal length 1. Numerical Data 4 given further below snows coefficients related to spherical aberration and astigmatism, namely, a third-order spherical aberration coefficient I (spherical aberration), a third-order astigmatism coefficient III (astigmatism), a fifth-order spherical aberration coefficient I^ (marginal spherical aberration), and a fifth-order astigmatism coefficient III^ (marginal astigmatism). Numerical Data 4 demonstrates aberration-coefficient variation values for each lens surface of the third lens unit L3 resulting from zooming from the wide angle end to the middle focal length 1.

In Numerical Data 4, the 18th lens surface and the 19th lens surface are, compared to the other lens surfaces, negatively large in their variation values for the third- and fifth-order spherical aberration coefficients and the third- and fifth-order astigmatism coefficients. The aberration-coefficient variation values of the 19th lens surface and the 20th lens surface cancel each other out because they are close values with opposite signs. Thus, in the third lens unit L3, it is the 16th lens surface that is dominant in terms of variation in aberration coefficients.

The 18th lens surface is the object-side surface of the negative lens G3bn constituting the second lens sub-unit L3b and is a concave surface facing the object side. Thus, during zooming from the wide angle end to the middle focal length 1, the third- and fifth-order spherical aberration coefficients and the third- and fifth-order astigmatism coefficients of the 18th lens surface are varied negatively to thereby suppress positive variation of the spherical aberration coefficients and astigmatism coefficients of the entire lens system. This prevents the entire lens system from being corrected too insufficiently for spherical aberration and astigmatism at the middle focal length 1, and therefore allows favorable correction for these aberrations.

As demonstrated in Table 1 given further below, the zoom lens of Embodiment 4 satisfies all of Conditions (1) to (7) and can therefore offer a high zoom ratio and high optical performance over the entire zoom range.

A zoom lens L9 of Embodiment 5 shown in FIG. 9 consists of, in order from the object side to the image side, the first lens unit L1 having a positive refractive power, the second lens unit L2 having a negative refractive power, the third lens unit L3 having a positive refractive power, and the rear lens group LR. The rear lens group LR consists of, in order from the object side to the image side, the fourth lens unit L4 having a positive refractive power and the fifth lens unit L5 having a negative refractive power.

Zooming from the wide angle end to the telephoto end is performed by the second lens unit L2 moving to the image side. The fourth lens unit L4 moves along a locus convex to the object side to correct image plane variation caused by the zooming. The first lens unit L1, the third lens unit L3, and the fifth lens unit L5 do not move for zooming.

In Embodiment 5, the first lens unit L1 corresponds to the 1st to 7th lens surfaces, and its lens closest to the object side is a cemented lens formed by cementing a positive lens and a negative lens. The second lens unit L2 corresponds to the 8th to 14th lens surfaces, and its lens closest to the image side is a cemented lens formed by cementing a positive lens and a negative lens. The aperture stop SP corresponds to the 15th surface. The third lens unit L3 corresponds to the 16th to 21st lens surfaces. The fourth lens unit L4 corresponds to the 22nd to 24th lens surfaces, and is a cemented lens formed by cementing a positive lens and a negative lens. The fifth lens unit L5 corresponds to the 25th and 26th lens surfaces.

During zooming from the wide angle end to the telephoto end, the second lens unit L2 moves to the image side linearly, and the fourth lens unit L4 moves along a locus convex to the object side, making substantially a reciprocating motion.

A description is now given of aberration-coefficient variation values for the lens surfaces of the third lens unit L3 of embodiment 5 during zooming from the wide angle end to the middle focal length 1. Numerical Data 5 given further below shows coefficients related to spherical aberration and astigmatism, namely, a third-order spherical aberration coefficient I (spherical aberration), a third-order astigmatism coefficient III (astigmatism), a fifth-order spherical aberration coefficient I^ (marginal spherical aberration), and a fifth-order astigmatism coefficient III^ (marginal astigmatism). Numerical Data 5 demonstrates aberration-coefficient variation values for each lens surface of the third lens unit L3 during zooming from the wide angle end to the middle focal length 1.

In Numerical Data 5, the 18th lens surface and the 19th lens surface are, compared to the other lens surfaces, negatively large in their variation values for the third- and fifth-order spherical aberration coefficients and the third- and fifth-order astigmatism coefficients. The aberration-coefficient variation values of the 19th lens surface and the 20th lens surface cancel each other out because they are close values in absolute values with opposite signs. Thus, in the third lens unit L3, it is the 18th lens surface that is dominant in terms of variation in aberration coefficients. The 18th lens surface is the object-side, concave surface of the negative lens G3bn constituting the second lens sub-unit L3b.

Thus, in a zoom from the wide angle end to the middle focal length 1, the third- and fifth-order spherical aberration coefficients and the third- and fifth-order astigmatism coefficients of the 18th lens surface are varied negatively to thereby suppress positive variation of the spherical aberration coefficients and astigmatism coefficients of the entire lens system. This prevents the entire lens system from being corrected too insufficiently for spherical aberration and astigmatism at the middle focal length 1, and therefore allows favorable correction for these aberrations. As demonstrated in Table 1 given further below, the zoom lens of Embodiment 5 satisfies all of Conditions (1) to (7) and can therefore offer a high zoom ratio and high optical performance over the entire zoom range.

Next, a monitoring camera (an image pickup apparatus) according to an embodiment using the zoom lens of the present invention as an image pickup optical system is described with reference to FIG. 12. In FIG. 12, reference numeral 30 denotes a monitoring camera body, and 31 denotes an image pickup optical system formed by any of the zoom lenses of Embodiments 1 to 5.

Reference numeral 32 denotes an image pickup element (photoelectric conversion element), such as a CCD sensor or a CMOS sensor, which is incorporated in the camera body 20 and configured to receive an image of an object formed by the image pickup optical system 31. Reference numeral 33 denotes a memory configured to record information that constitutes the object image photoelectrically converted by the image pickup element 32. Reference numeral 34 denotes a network cable used to transfer the object image photoelectrically converted by the image pickup element 32.

The preferred embodiments of the present invention have been described above. The present invention is, however, not limited to these embodiments and can be variously modified and changed without departing from the gist of the invention.

Numerical Data 1 to Numerical Data 5 corresponding to Embodiments 1 to 5, respectively, are provided below. In each numerical data, "i" represents the ordinal number of a surface from the object side, "ri" represents the radius of curvature of the i-th surface, "di" represents an interval between the i-th surface and the i+1-th surface (either lens thickness or air interval), and "ndi" and "vdi" represent a refractive index and an Abbe number, respectively, of material of the i-th lens. In numerical Data 1 to 5, the two surfaces closest to the image side are flat surfaces corresponding to a glass block. The section "Various Data" in each numerical data below provides data for the wide angle end, the middle focal length 1, the middle focal length 2, and the telephoto end.

Values of the focal length, the f-number, and the half angle of view are obtained when the focus is at infinity. BF represents a back focus which is a distance from the last lens surface to the image plane (i.e., a back focus in air). The overall lens length is a distance combining the back focus BF and a distance from the first lens surface to the last lens surface. In addition, an aspherical shape is expressed as follows:

$$x=(y^2/r)/(1+(1-k\cdot y^2/r^2)^{0.5})+A4\cdot y^4+A6\cdot y^6+A8\cdot y^8+A10\cdot y^{10}+A12\cdot y^{12}$$

where "x" represents a coordinate in a direction along the optical axis, "y" represents a coordinate in a direction perpendicular to the optical axis, "r" represents the radius of curvature of the reference sphere, "k" represents a conic constant, and "An" represents an n-th-order aspherical coefficient.

In the following numerical data, "e-x" represents "×10$^{-x}$". Aspherical lens surfaces have their surface numbers asterisked. Table 1 shows the correspondence between Embodiments 1 to 5 and each of the conditions described above.

[Numerical Data 1]

| [unit: mm] Surface Data surface no. i | ri | di | ndi | vdi |
|---|---|---|---|---|
| 1 | 169.111 | 1.50 | 1.95375 | 32.3 |
| 2 | 58.873 | 7.98 | 1.49700 | 81.5 |
| 3 | −236.827 | 0.15 | | |
| 4 | 54.542 | 5.84 | 1.49700 | 81.5 |
| 5 | 70186.594 | 0.10 | | |
| 6 | 37.008 | 3.83 | 1.59522 | 67.7 |
| 7 | 81.960 | (variable) | | |
| 8 | 62.827 | 0.55 | 2.00100 | 29.1 |
| 9 | 8.515 | 3.80 | | |
| 10 | −41.479 | 0.50 | 1.91082 | 35.3 |
| 11 | 26.434 | 0.83 | | |
| 12 | 18.055 | 2.90 | 1.95906 | 17.5 |
| 13 | −43.117 | 0.50 | 1.91082 | 35.3 |
| 14 | 97.237 | (variable) | | |
| 15(stop) | ∞ | 1.00 | | |
| 16 | 16.288 | 2.90 | 1.69680 | 55.5 |
| 17 | 231.698 | 11.16 | | |
| 18* | −11.046 | 1.00 | 1.91082 | 35.3 |
| 19* | 26.026 | 0.42 | | |
| 20 | 25.126 | 4.32 | 1.55332 | 71.7 |
| 21 | −10.588 | (variable) | | |
| 22* | 14.572 | 5.18 | 1.49710 | 81.6 |
| 23 | −18.878 | 0.60 | 1.92286 | 18.9 |
| 24 | −21.191 | (variable) | | |
| 25 | ∞ | 1.44 | 1.51633 | 64.1 |
| 26 | ∞ | 3.81 | | |
| image plane | ∞ | | | |

Aspherical Surface Data
18th surface
k = 1.11419e+000
A4 = −8.54541e−006
A6 = 4.11250e−006
A8 = 4.36405e−008
A10 = 1.16196e−013
19th surface
k = 2.22922e+000
A4 = −5.79010e−005
A6 = 3.16736e−066
A8 = −2.78036e−008
A10 = 9.78697e−013
22th surface
k = −2.15989e+000
A4 = 1.58587e−005
A6 = −1.80668e−007
Various Data
zoom ratio    39.85

| | wide angle end | middle focal length 1 | middle focal length 2 | tele-photo end |
|---|---|---|---|---|
| focal length | 4.52 | 9.01 | 37.69 | 180.02 |
| F-NUMBER | 1.65 | 1.92 | 2.74 | 4.60 |
| half angle of view (degs.) | 33.59 | 18.41 | 4.55 | 0.95 |
| image height | 3.00 | 3.00 | 3.00 | 3.00 |
| overall lens length | 119.96 | 119.96 | 119.96 | 119.96 |
| BF | 16.04 | 18.35 | 21.01 | 7.08 |
| d7 | 0.60 | 15.70 | 33.18 | 40.33 |
| d14 | 40.60 | 25.50 | 8.02 | 0.87 |
| d21 | 7.67 | 5.36 | 2.70 | 16.63 |
| d24 | 11.29 | 13.60 | 16.26 | 2.32 |

| Lens Unit Data unit no. | frontmost surface | focal length |
|---|---|---|
| 1 | 1 | 54.99 |
| 2 | 8 | −8.98 |
| 3 | 15 | 48.61 |
| 4 | 22 | 19.07 |
| 5 | 25 | ∞ |

| Aberration Coefficient Variation | | | | |
|---|---|---|---|---|
| surface no. | I | III | Î | ÎÎÎ |
| 16 | 0.434 | 0.019 | 4.112 | 4.818 |
| 17 | −0.158 | −0.014 | 0.337 | −0.034 |
| 18 | −0.550 | −0.072 | −4.531 | −10.069 |
| 19 | −6.296 | −0.531 | −14.941 | −28.373 |
| 20 | 6.419 | 0.509 | 11.881 | 29.200 |
| 21 | −0.119 | 0.006 | 3.375 | 2.799 |

[Numerical Data 2]

| [unit: mm] Surface Data surface no. i | ri | di | ndi | vdi |
|---|---|---|---|---|
| 1 | −77.550 | 1.25 | 1.85478 | 24.8 |
| 2 | 47.172 | 6.82 | 1.49700 | 81.5 |
| 3 | 986.248 | 0.15 | | |
| 4 | 56.810 | 3.87 | 1.49700 | 81.5 |
| 5 | 219.543 | 0.10 | | |
| 6 | 32.425 | 4.31 | 1.59522 | 67.7 |
| 7 | 74.111 | (variable) | | |
| 8 | 29.254 | 0.45 | 2.00100 | 29. |
| 9 | 6.818 | 4.32 | | |
| 10 | −18.525 | 0.40 | 2.00100 | 29.1 |
| 11 | 32.321 | 0.12 | | |
| 12 | 18.704 | 6.05 | 1.95906 | 17.5 |
| 13 | −23.935 | 0.40 | 2.00100 | 29.1 |
| 14 | −46.052 | (variable) | | |
| 15(stop) | ∞ | 1.00 | | |
| 16* | 27.447 | 2.22 | 1.69350 | 53.2 |
| 17* | −37.331 | 6.10 | | |
| 18 | −16.001 | 0.50 | 2.00100 | 29.1 |
| 19 | −60.361 | 1.37 | 1.49700 | 81.5 |
| 20 | −18.566 | (variable) | | |
| 21* | 18.331 | 3.48 | 1.49710 | 81.6 |
| 22 | −12.208 | 0.50 | 1.94595 | 18.0 |
| 23 | −14.400 | (variable) | | |
| 24 | ∞ | 1.44 | 1.51633 | 64.1 |
| 25 | ∞ | 3.81 | | |
| image plane | ∞ | | | |

Aspherical Surface Data
16th surface
k = −1.15877e+000
A4 = −3.03420e−005
A6 = −4.59098e−007
A8 = 2.54266e−009
A10 = −5.23656e−011

-continued

A12 = 3.22553e-013
17th surface
k = 6.94596e+000
A4 = -1.78024e-005
A6 = -2.07778e-007
21th surface
k = -5.72488e+000
A4 = -4.07468e-006
A6 = -5.31341e-007
Various Data
zoom ratio    32.01

|  | wide angle | middle 1 | middle 2 | telephoto |
|---|---|---|---|---|
| focal length | 4.40 | 9.06 | 37.93 | 140.95 |
| F-NUMBER | 1.65 | 1.92 | 2.74 | 4.90 |
| half angle of view (degs.) | 34.27 | 18.33 | 4.52 | 1.22 |
| image height | 3.00 | 3.00 | 3.00 | 3.00 |
| overall lens length | 104.12 | 104.12 | 104.12 | 104.12 |
| BF | 15.70 | 17.69 | 19.68 | 7.58 |
| d7 | 0.58 | 13.89 | 29.29 | 35.59 |
| d14 | 36.80 | 23.50 | 8.10 | 1.80 |
| d20 | 7.64 | 5.65 | 3.66 | 15.76 |
| d23 | 10.95 | 12.94 | 14.92 | 2.83 |

Lens Unit Data

| Unit no. | frontmost surface | focal length |
|---|---|---|
| 1 | 1 | 50.65 |
| 2 | 8 | -8.50 |
| 3 | 15 | 42.00 |
| 4 | 21 | 18.40 |

Aberration Coefficient Variation

| surface no. | I | III | I^ | III^ |
|---|---|---|---|---|
| 16 | 0.636 | 0.016 | -6.224 | 1.092 |
| 17 | -0.090 | -0.009 | 9.518 | 0.405 |
| 18 | 0.484 | 0.001 | -6.720 | 0.080 |
| 19 | -0.001 | -0.007 | 0.017 | -0.038 |
| 20 | -0.244 | -0.002 | 1.236 | 0.082 |

[Numerical Data 3]

[unit: mm]
Surface Data

| surface no. i | ri | di | ndi | vdi |
|---|---|---|---|---|
| 1 | 61.694 | 1.25 | 1.85478 | 24.8 |
| 2 | 36.692 | 5.09 | 1.49700 | 81.5 |
| 3 | 351.098 | 0.15 |  |  |
| 4 | 37.818 | 3.63 | 1.59522 | 67.7 |
| 5 | 144.011 | 0.10 |  |  |
| 6 | 32.749 | 2.61 | 1.59522 | 67.7 |
| 7 | 70.333 | (variable) |  |  |
| 8 | 113.068 | 0.45 | 2.00100 | 29.1 |
| 9 | 7.545 | 3.71 |  |  |
| 10 | -33.501 | 0.40 | 1.91082 | 35.3 |
| 11 | 23.071 | 0.12 |  |  |
| 12 | 14.104 | 3.40 | 1.95906 | 17.5 |
| 13 | -19.233 | 0.40 | 2.00100 | 29.1 |
| 14 | 59.892 | (variable) |  |  |
| 15(stop) | ∞ | 0.34 |  |  |
| 16* | 12.356 | 3.24 | 1.58313 | 59.4 |
| 17* | -43.588 | 6.06 |  |  |
| 18 | -33.488 | 0.45 | 2.00100 | 29.1 |
| 19 | 16.641 | 1.98 |  |  |
| 20 | 41.860 | 2.22 | 1.48749 | 70.2 |
| 21 | -14.224 | (variable) |  |  |
| 22* | 15.458 | 2.66 | 1.55332 | 71.7 |
| 23 | -20.460 | 0.50 | 1.85478 | 24.8 |
| 24 | -28.023 | (variable) |  |  |
| 25 | ∞ | 1.44 | 1.51633 | 64.1 |
| 26 | ∞ | 3.81 |  |  |
| image plane | ∞ |  |  |  |

Aspherical Surface Data
16th surface
k = -2.67885e-001
A4 = -2.16198e-005
A6 = -1.62899e-008
A8 = -1.14778e-009
17th surface
k = -1.91247e+000
A4 = 4.91855e-005
A6 = -2.11045e-007
22th surface
k = -1.52968e+000
A4 = 1.83889e-005
A6 = -1.37950e-007
Various Data
zoom ratio    38.80

|  | wide angle | middle 1 | middle 2 | telephoto |
|---|---|---|---|---|
| focal length | 4.00 | 9.71 | 42.23 | 155.31 |
| F-NUMBER | 1.65 | 1.92 | 2.74 | 4.90 |
| half angle of view (degs.) | 36.85 | 17.17 | 4.06 | 1.11 |
| image height | 3.00 | 3.00 | 3.00 | 3.00 |
| overall lens length | 94.52 | 94.52 | 94.52 | 94.52 |
| BF | 13.51 | 17.95 | 22.62 | 6.80 |
| d7 | 0.58 | 11.37 | 23.87 | 28.98 |
| d14 | 37.05 | 19.60 | 6.09 | 1.80 |
| d21 | 4.64 | 6.85 | 3.19 | 18.19 |
| d24 | 8.75 | 13.20 | 17.87 | 2.05 |

Lens Unit Data

| unit no. | frontmost surface | focal length |
|---|---|---|
| 1 | 1 | 42.00 |
| 2 | 8 | -6.59 |
| 3 | 15 | 29.81 |
| 4 | 22 | 19.83 |

Aberration Coefficient Variation

| surface no. | I | III | I^ | III^ |
|---|---|---|---|---|
| 16 | 5.860 | 0.018 | 0.195 | 3.189 |
| 17 | -2.896 | -0.011 | -0.933 | -0.776 |
| 18 | 0.506 | 0.003 | -3.658 | 0.413 |
| 19 | -5.918 | -0.172 | 0.552 | -5.221 |
| 20 | 2.114 | 0.109 | -0.156 | 2.315 |
| 21 | 0.181 | 0.000 | 2.019 | 0.027 |

[Numerical Data 4]

[unit: mm]
Surface Data

| surface no. i | ri | di | ndi | vdi |
|---|---|---|---|---|
| 1 | 173.897 | 1.50 | 1.95375 | 32.3 |
| 2 | 59.055 | 7.29 | 1.49700 | 81.5 |
| 3 | -226.123 | 0.15 |  |  |
| 4 | 56.710 | 5.16 | 1.49700 | 81.5 |
| 5 | 2867.002 | 0.10 |  |  |
| 6 | 36.896 | 3.99 | 1.59522 | 67.7 |
| 7 | 90.140 | (variable) |  |  |
| 8 | 59.875 | 0.55 | 2.00100 | 29.1 |
| 9 | 8.694 | 3.71 |  |  |
| 10 | -45.667 | 0.50 | 1.91082 | 35.3 |
| 11 | 23.405 | 0.95 |  |  |
| 12 | 17.986 | 3.20 | 1.95906 | 17.5 |
| 13 | -53.953 | 0.50 | 1.91082 | 35.3 |
| 14 | 114.496 | (variable) |  |  |
| 15(stop) | ∞ | 1.00 |  |  |

-continued

| | | | | |
|---|---|---|---|---|
| 16 | 15.956 | 2.95 | 1.71300 | 53.9 |
| 17 | 234.501 | 9.73 | | |
| 18* | −12.566 | 1.00 | 1.88202 | 37.2 |
| 19* | 20.502 | 0.88 | | |
| 20 | 24.793 | 4.60 | 1.49700 | 81.5 |
| 21 | −10.960 | (variable) | | |
| 22* | 15.267 | 5.63 | 1.49710 | 81.6 |
| 23 | −17.464 | 0.60 | 1.92286 | 18.9 |
| 24 | −20.426 | (variable) | | |
| 25 | ∞ | 1.44 | 1.51633 | 64.1 |
| 26 | ∞ | 3.81 | | |
| image plane | ∞ | | | |

Aspherical Surface Data
18th surface
k = 1.77076e+000
A4 = −1.35502e−005
A6 = 4.01637e−006
A8 = 4.26506e−008
A10 = 1.16196e−013
19th surface
k = 7.72282e−001
A4 = −7.82141e−005
A6 = 3.11249e−006
A8 = −2.22545e−008
A10 = 9.78897e−013
22th surface
k = −1.06421e+000
A4= −2.53446e−005
A6 = −9.86042e−008

Various Data
zoom ratio    38.80

| | wide angle | middle 1 | middle 2 | telephoto |
|---|---|---|---|---|
| focal length | 4.63 | 9.27 | 38.37 | 179.82 |
| F-NUMBER | 1.65 | 1.92 | 2.74 | 4.60 |
| half angle of view (degs.) | 32.91 | 17.92 | 4.47 | 0.96 |
| image height | 3.00 | 3.00 | 3.00 | 3.00 |
| overall lens length | 120.20 | 120.20 | 120.20 | 120.20 |
| BF | 17.02 | 19.28 | 21.66 | 7.19 |
| d7 | 0.60 | 15.57 | 32.91 | 40.00 |
| d14 | 41.21 | 26.24 | 8.91 | 1.81 |
| d21 | 7.37 | 5.11 | 2.74 | 17.20 |
| d24 | 12.27 | 14.53 | 16.90 | 2.44 |

Lens Unit Data

| unit no. | frontmost surface | focal length |
|---|---|---|
| 1 | 1 | 54.1 |
| 2 | 8 | −9.25 |
| 3 | 15 | 52.89 |
| 4 | 22 | 19.74 |

Aberration Coefficient Variation

| surface no. | I | III | Î | ÎÎÎ |
|---|---|---|---|---|
| 16 | 0.760 | 0.019 | 4.162 | 4.766 |
| 17 | −0.201 | −0.013 | 0.457 | −0.083 |
| 18 | −0.774 | −0.053 | −6.585 | −8.599 |
| 19 | −5.782 | −0.405 | −9.783 | −23.126 |
| 20 | 5.594 | 0.372 | 8.739 | 22.815 |
| 21 | 0.001 | 0.004 | 3.213 | 2.253 |

[Numerical Data 5]

[unit: mm]
Surface Data

| surface no. i | ri | di | ndi | vdi |
|---|---|---|---|---|
| 1 | 174.209 | 1.50 | 1.95375 | 32.3 |
| 2 | 59.606 | 7.19 | 1.49700 | 81.5 |
| 3 | −232.790 | 0.15 | | |
| 4 | 57.418 | 5.11 | 1.49700 | 81.5 |

-continued

| | | | | |
|---|---|---|---|---|
| 5 | 2552.334 | 0.10 | | |
| 6 | 37.157 | 3.84 | 1.59522 | 67.7 |
| 7 | 89.811 | (variable) | | |
| 8 | 54.494 | 0.55 | 2.00100 | 29.1 |
| 9 | 8.540 | 3.81 | | |
| 10 | −50.421 | 0.50 | 1.91082 | 35.3 |
| 11 | 24.217 | 0.79 | | |
| 12 | 17.102 | 3.28 | 1.95906 | 17.5 |
| 13 | −57.577 | 0.50 | 1.91082 | 35.3 |
| 14 | 77.300 | (variable) | | |
| 15(stop) | ∞ | 1.00 | | |
| 16 | 16.249 | 3.06 | 1.71300 | 53.9 |
| 17 | 331.428 | 9.41 | | |
| 18* | −13.164 | 1.00 | 1.88202 | 37.2 |
| 19* | 19.324 | 0.87 | | |
| 20 | 23.243 | 4.55 | 1.49700 | 81.5 |
| 21 | −11.353 | (variable) | | |
| 22* | 15.785 | 5.41 | 1.49710 | 81.6 |
| 23 | −17.873 | 0.60 | 1.92286 | 18.9 |
| 24 | −20.541 | (variable) | | |
| 25 | 37.927 | 0.50 | 1.77250 | 49.6 |
| 26 | 33.332 | 1.0 | | |
| 27 | ∞ | 1.44 | 1.51633 | 64.1 |
| 28 | ∞ | 3.81 | | |
| image plane | ∞ | | | |

Aspherical Surface Data
18th surface
k = 2.01519e+000
A4 = −1.01119e−005
A6 = 3.42713e−006
A8 = 5.34517e−008
A10 = 1.16196e−013
19th surface
k = −5.76782e−001
A4 = −6.61263e−005
A6 = 2.94737e−006
A8 = −1.43738e−008
A10 = 9.78697e−013
22th surface
k = −9.07988e−001
A4 = −3.22561e−005
A6= −9.81704e−008

Various Data
zoom ratio    38.80

| | wide angle | middle 1 | middle 2 | telephoto |
|---|---|---|---|---|
| focal length | 4.64 | 9.33 | 39.14 | 179.99 |
| F-NUMBER | 1.65 | 1.92 | 2.74 | 4.60 |
| hair angle of view (degs.) | 32.89 | 17.83 | 4.38 | 0.95 |
| image height | 3.00 | 3.00 | 3.00 | 3.00 |
| overall lens length | 122.06 | 122.06 | 122.06 | 122.06 |
| BF | 5.75 | 5.75 | 5.75 | 5.75 |
| d7 | 0.60 | 15.89 | 33.59 | 40.83 |
| d14 | 42.92 | 27.63 | 9.93 | 2.69 |
| d21 | 7.64 | 5.33 | 2.76 | 17.08 |
| d24 | 11.44 | 13.75 | 16.32 | 2.00 |

Lene Unit Data

| unit no. | frontmost surface | focal length |
|---|---|---|
| 1 | 1 | 55.38 |
| 2 | 8 | −9.25 |
| 3 | 15 | 53.93 |
| 4 | 22 | 19.98 |
| 5 | 25 | −373.88 |

Aberration Coefficient Variation

| surface no. | I | III | Î | ÎÎÎ |
|---|---|---|---|---|
| 16 | 0.978 | 0.018 | 4.465 | 4.678 |
| 17 | −0.253 | −0.012 | 0.594 | −0.115 |
| 18 | −0.992 | −0.047 | −8.477 | −8.143 |
| 19 | −6.530 | −0.385 | −9.285 | −23.209 |

-continued

| | | | | |
|---|---|---|---|---|
| 20 | 6.483 | 0.356 | 9.408 | 23.421 |
| 21 | −0.048 | 0.002 | 3.380 | 1.731 |

TABLE 1

| | Conditions | | | | | | |
|---|---|---|---|---|---|---|---|
| | (1) | (2) | (3) | (4) | (5) | (6) | (7) |
| Emb. 1 | −0.227 | 0.220 | 0.514 | −0.856 | 0.31 | 2.83 | 2.55 |
| Emb. 2 | −0.381 | 0.156 | 0.551 | −0.931 | 0.36 | 6.36 | 2.28 |
| Emb. 3 | −1.124 | 0.168 | 0.566 | −1.046 | 0.27 | 1.17 | 1.50 |
| Emb. 4 | −0.238 | 0.190 | 0.452 | −0.687 | 0.30 | 4.10 | 2.68 |
| Emb. 5 | −0.244 | 0.182 | 0.443 | −0.654 | 0.31 | 3.92 | 2.70 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-186576, filed Sep. 24, 2015, which is hereby incorporated by reference herein in its entirety.

What is claimed is:

1. A zoom lens comprising, in order from an object side to an image side, a first lens unit having a positive refractive power, a second lens unit having a negative refractive power, a third lens unit having a positive refractive power, and a rear lens group including one or more lens units, wherein
during zooming, the first lens unit does not move, the second lens unit and at least one of the lens units of the rear lens group move, and intervals between adjacent ones of the lens units change during the zooming,
an aperture stop is arranged between the second lens unit and the third lens unit,
the third lens unit consists of a first lens sub-unit having a positive refractive power and a second lens sub-unit having a negative refractive power and being located on the image side of the first lens sub-unit with the largest air interval within the third lens unit,
the second lens sub-unit consists of, in order from the object side to the image side, a negative lens G3$bn$ and a positive lens G3$bp$, and
the following conditions are satisfied:

$$-2.0 < R3bn1/f3 < -0.1$$

$$0.15 < D3ab/Dsi < 0.30$$

where R3bn1 is a radius of curvature of an object-side surface of the negative lens G3$bn$, f3 is a focal length of the third lens unit, D3ab is an air interval between the first lens sub-unit and the second lens sub-unit, and Dsi is a distance combining a back focus in air and a distance from the aperture stop to a lens surface closest to the image side at a wide angle end.

2. The zoom lens according to claim 1, wherein the following condition is satisfied:

$$0.2 < f3a/f3 < 1.0$$

where f3a is a focal length of the first lens sub-unit.

3. The zoom lens according to claim 1, wherein the following condition is satisfied:

$$-2.2 < f3b/f3 < -0.2$$

where f3b is a focal length of the second lens sub-unit.

4. The zoom lens according to claim 1, wherein the following condition is satisfied:

$$0.1 < f1/ft < 1.0$$

where f1 is a focal length of the first lens unit, and ft is a focal length of the zoom lens at a telephoto end.

5. The zoom lens according to claim 1, wherein the following condition is satisfied:

$$0.5 < (\beta 2t/\beta 2w)/(ft/fw) < 10.0$$

where β2t is a lateral magnification of the second lens unit at a telephoto end, β2w is a lateral magnification of the second lens unit at a wide angle end, fw is a focal length of the zoom lens at the wide angle end, and ft is a focal length of the zoom lens at the telephoto end.

6. The zoom lens according to claim 1, wherein the rear lens group consists of a fourth lens unit having a positive refractive power.

7. The zoom lens according to claim 6, wherein the following condition is satisfied:

$$1.0 < f3/f4 < 3.0$$

where f4 is a focal length of the fourth lens unit.

8. The zoom lens according to claim 6, wherein the fourth lens unit consists of a cemented lens formed by cementing a positive lens and a negative lens.

9. The zoom lens according to claim 1, wherein the rear lens group consists of, in order from the object side to the image side, a fourth lens unit having a positive refractive power and a fifth lens unit having a negative refractive power, and
for zooming, the fourth lens unit moves, and the fifth lens unit does not move.

10. The zoom lens according to claim 9, wherein the following condition is satisfied:

$$1.0 < f3/f4 < 3.0$$

where f4 is a focal length of the fourth lens unit.

11. The zoom lens according to claim 9, wherein the fourth lens unit consists of a cemented lens formed by cementing a positive lens and a negative lens.

12. An image pickup apparatus, comprising:
a zoom lens; and
an image pickup device configured to receive an image formed by the zoom lens,
the zoom lens comprising, in order from an object side to an image side: a first lens unit having a positive refractive power, a second lens unit having a negative refractive power, a third lens unit having a positive refractive power, and a rear lens group including one or more lens units, wherein
during zooming, the first lens unit does not move, and the second lens unit and at least one of the lens units of the rear lens group move, and intervals between adjacent ones of the lens units change during the zooming,
an aperture stop is arranged between the second lens unit and the third lens unit,
the third lens unit consists of a first lens sub-unit having a positive refractive power and a second lens sub-unit having a negative refractive power and being located on the image side of the first lens sub-unit with the largest air interval within the third lens unit,
the second lens sub-unit consists of, in order from the object side to the image side, a negative lens G3$bn$ and a positive lens G3$bp$, and the following conditions are satisfied:

$$-2.0 < R3bn1/f3 < -0.1$$

$$0.15 < D3ab/Dsi < 0.30$$

where R3bn1 is a radius of curvature of an object-side surface of the negative lens G3*bn*, f3 is a focal length of the third lens unit, D3ab is an air interval between the first lens sub-unit and the second lens sub-unit, and Dsi is a distance combining a back focus in air and a distance from the aperture stop to a lens surface closest to the image side at a wide angle end.

* * * * *